(12) United States Patent
Tabota et al.

(10) Patent No.: US 9,959,684 B2
(45) Date of Patent: May 1, 2018

(54) METHOD FOR USING A COMPUTER GRAPHICS SYSTEM FOR CHANGING THE SHAPE OF THE SURFACE OF MODELS OF GEOMETRIC SOLIDS WITH THE AID OF DEFORMATION AND DEVICE FOR IMPLEMENTING SAME

(71) Applicant: VERT ROTORS UK LIMITED, Edinburgh (GB)

(72) Inventors: Evgeniy Tabota, Edinburgh (GB); Oleg Dmitriev, Edinburgh (GB)

(73) Assignee: VERT ROTORS UK LIMITED, Edinburgh (GB)

( * ) Notice: Subject to any disclaimer, the term of this patent is extended or adjusted under 35 U.S.C. 154(b) by 0 days. days.

(21) Appl. No.: 14/896,645

(22) PCT Filed: Jun. 6, 2013

(86) PCT No.: PCT/GB2013/051497
§ 371 (c)(1),
(2) Date: Dec. 7, 2015

(87) PCT Pub. No.: WO2014/195661
PCT Pub. Date: Dec. 11, 2014

(65) Prior Publication Data
US 2016/0140772 A1 May 19, 2016

(51) Int. Cl.
*G06T 19/20* (2011.01)
*G06T 17/00* (2006.01)
*G06T 17/10* (2006.01)

(52) U.S. Cl.
CPC ............. *G06T 19/20* (2013.01); *G06T 17/00* (2013.01); *G06T 17/10* (2013.01); *G06T 2219/2021* (2013.01)

(58) Field of Classification Search
CPC ...... G06F 17/50; G06F 17/10; G06F 17/5018; G06F 17/5086; G06F 3/04883;
(Continued)

(56) References Cited

U.S. PATENT DOCUMENTS

| 4,821,214 A | 11/1989 | Sederberg |
| 8,112,256 B2 | 2/2012 | Ravnikar |
| 2005/0248562 A1* | 11/2005 | Maystrovsky .......... G06F 17/50 345/419 |

FOREIGN PATENT DOCUMENTS

| EP | 1 594 073 A2 | 11/2005 |
| WO | 8706654 | 5/1987 |

OTHER PUBLICATIONS

Angelidis et al, "Sweepers: Swept user-de .ned tools for modeling by deformation", Jun. 7, 2004, pp. 63-73, IEEE, Piscataway, NJ.
(Continued)

*Primary Examiner* — Ke Xiao
*Assistant Examiner* — Raffi Isanians
(74) *Attorney, Agent, or Firm* — Womble Bond Dickinson (US) LLP

(57) ABSTRACT

The proposed method for using a computer graphics system for changing the shape of models of geometric solids with the aid of deformation is characterized in that it is used for producing geometric solids which mate with one another as they were relative to one another and have mating surfaces, which require manufacture with precision accuracy (up to 10 micrometers), for example toothed screws (cylindrical, conical) of a screw compressor unit, gear trains, gears of a gear pump and similar mating pairs of geometric solids. The proposed method consists in that deformation of a model (3) of a semifinished product (3) of a first mating solid (1) is performed with the aid of a model (7) of a first tool (7), whose surface is automatically calculated using several mathematical laws, each of which is a polynomial in which (Continued)

at least one of the coefficients represents one of several characteristics defining the geometry of the shape of the surface of the second geometric solid (2). Deformation of a model (4) of a semifinished product (4) of a second mating solid (2) is performed with the aid of a model (10) of a second tool (10), which represents a deformed target model (8) of the first solid (1). Furthermore, said deformation is performed in accordance with a law for a movement imitating the movement of the geometric solids (1), (2) which mate with one another during use relative to one another. The proposed device is capable of implementing the proposed method.

14 Claims, 14 Drawing Sheets

(58) Field of Classification Search
CPC .............. G06F 3/04845; G06F 2217/06; G06F 17/5009; G06F 2217/16; G06F 3/04815; G06T 19/20; G06T 17/10; G06T 17/20; G06T 2219/2021; G06T 17/00; G06T 19/00; G06T 17/30; G06T 11/203
See application file for complete search history.

(56) References Cited

OTHER PUBLICATIONS

International Search Report dated Jul. 23, 2013 in PCT/GB2013/051497 filed Jun. 6, 2013.
"Solid Modeling: A Historical Summary and Contemporary Assessment", IEEE Computer Graphics and Applications, vol. 2 No. 2, Mar. 1982, pp. 9-24.
"Solid Modeling: Current Status and Research Directions", IEEE Computer Graphics and Applications, vol. 2 No. 2, Oct. 1983, pp. 25-37.
Yastrebova et al., "Tekhnologiya kompressorostroeniya", Moscow, Mashinostroenie 1987, pp. 15-19.
Yastrebova et al., "Tekhnologiya kompressorostroeniya", Moscow, Mashinostroenie 1987, pp. 92-113, paragraph 9 "Manufacture of rotors for screw compressors".

* cited by examiner

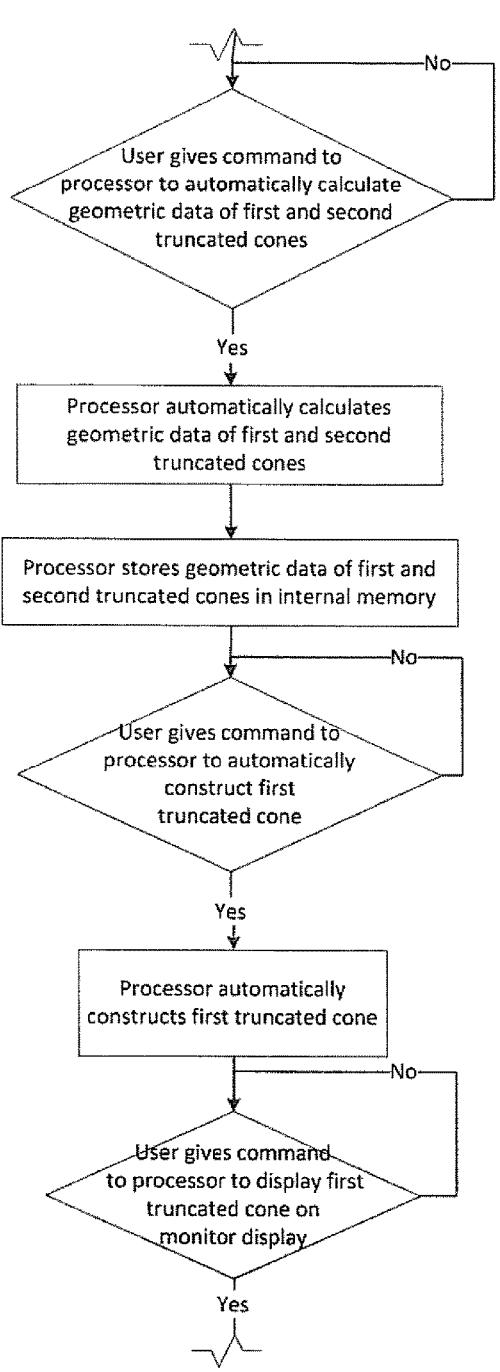
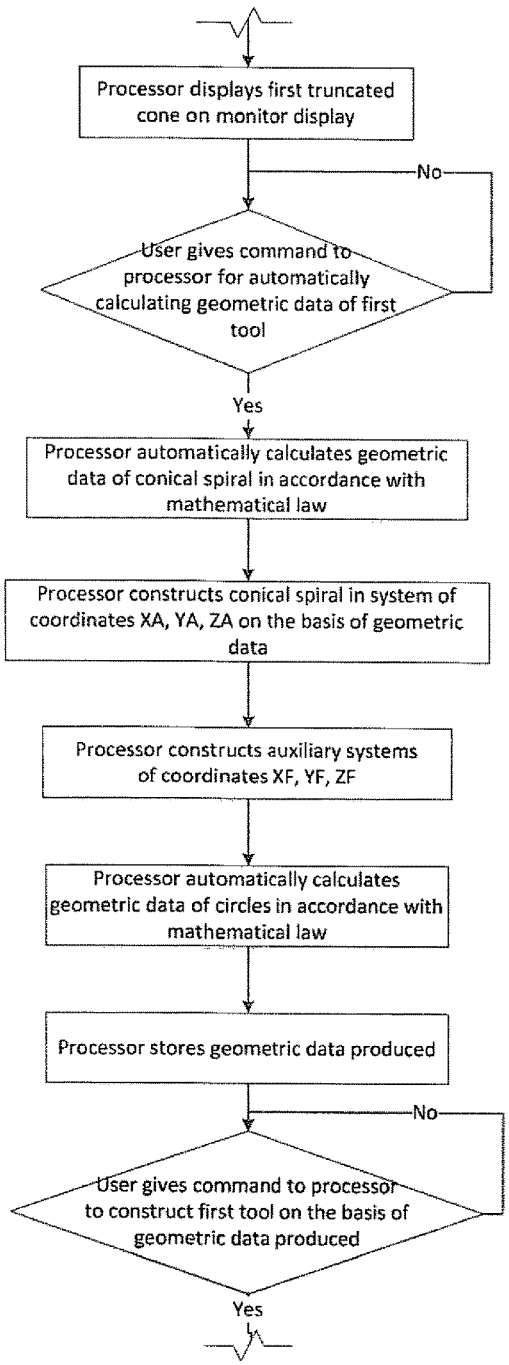
Fig. 8e
Fig. 8f a)                                      b)

a)                                      b)

METHOD FOR USING A COMPUTER GRAPHICS SYSTEM FOR CHANGING THE SHAPE OF THE SURFACE OF MODELS OF GEOMETRIC SOLIDS WITH THE AID OF DEFORMATION AND DEVICE FOR IMPLEMENTING SAME

FIELD OF THE INVENTION

The present invention relates to computer graphics systems which can be used for the automatic geometric construction of models of geometric solids which mate with one another during use as they move relative to one another, and to be more precise to a method for using a computer graphics system for changing the shape of models of geometric solids with the aid of deformation and device for implementing same.

AVAILABLE PRIOR ART

At present there are generally known laws which make it possible to manufacture certain pairs of mating geometric solids having sufficiently simple mating surfaces, for example an outer and an inner cylinder of a rotary pump or of a piston pump. Specialist machine tools have been manufactured for this purpose. Only these specialist machine tools should be used to manufacture a specific mating pair of geometric solids.

However, any change to the geometry of the shape of the surface of the solids results in the need to develop new laws and correspondingly new machine tools, which is very labour-intensive and economically unjustified, and in the majority of cases is also practically impossible.

Furthermore, there are pairs of geometric solids which mate with one another as they move relative to one another during use, for example pairs of mating geometric solids of conical rotary compressors, the mating surfaces of which have a complex shape which is impossible to manufacture with precision accuracy for the processing on existing machine tools with numerical control (NC) on the basis of existing generally known laws.

The present invention makes it possible to model geometric solids which mate with one another as they move relative to one another during use and have a complex shape of mating surfaces, and then to manufacture each of these solids with precision for the processing of the mating surfaces (up to 10 micrometers).

The present invention relates to the generation of parametric models associated with a 3D geometry of mating solids, to be precise to a fourth type of CAD for systems and digital control programs for machine tools with NC. In practice, the determination of mating parametric models and geometric data of the surfaces of mating solids is integrated in a cycle for constructing set solids, during which the determination of geometric parameters for constructing a first 3D solid is performed, which is used as the basis for constructing a second 3D solid.

The essential advantage of the present invention consists in that the construction of models of two mating solids is completely interrelated and integrated in one cycle, wherein the two models are completely interrelated.

With the development of computers, CAD has become a subject of widespread interest.

A A G Requicha and H B Voelcker have presented an overview of the historical development and an evaluation of CAD (see "Solid Modeling: A Historical Summary and Contemporary Assessment", IEEE Computer Graphics and Applications, Vol. 2 No. 2, March 1982, pages 9-24; see also "Solid Modeling: Current Status and Research Directions", IEEE Computer Graphics and Applications, October 1983, pages 25-37).

As observed by the above-cited authors, since the appearance of interactive computer graphics systems of computer-based coordinate geometry for work with graphic design and programming languages of machine tools with numerical control (NC), CAD has been developed in four directions.

The first of these four directions was the development of a so-called wire-frame graphics system. The second type of CAD comprises polygonal graphics systems. The third type of CAD comprises relief surface systems.

However, these three types of CAD cannot be used for producing models of two geometric solids which mate with one another during use since these types of CAD do not provide complete information on geometric data of the surfaces of these models.

The fourth type of CAD comprises methods and systems for modelling a solid which are directed to a representation of complete information relating to solids, specifically to a representation which makes it possible to clearly determine the geometric data of any represented object, wherein these geometric data can be automatically determined computationally.

It follows from this that said fourth type of CAD can be used for producing complete information relating to geometric data of the surfaces of models of solids being produced.

At present, as the complexity of the shapes of the geometric solids needing to be manufactured increases, it is increasingly hard to manufacture geometric solids with a complex shape which will mate with another as they move relative to one another during use without the formation of gaps, that is with a high degree of smoothness of the mating surfaces, without the use of specially developed procedures and mathematical laws. In the majority of cases, it is impossible to do this, that is it is impossible to process mating surfaces of geometric solids with a complex shape with a high precision (with a roughness of the mating surfaces of up to 10 micrometers) which ensures the functionality of the mating solids.

Furthermore, if attempts are made to manufacture mating solids with a complex shape manually, it is necessary to perform a huge amount of scientific work for developing mathematical laws which will completely describe the three-dimensional shape of the complex surface of each of the mating solids, which is not always possible.

Geometric solids with a complex shape include, for example, mating geometric solids of rotary screw compressors ("Tekhnologiya kompressorostroeniya" N. A. Yastrebova, A. I. Kondakov, V. D. Lubenets, A. N. Vinogradov, Moscow, "Mashinostroenie" 1987, pages 15-19), which comprise a housing and two conical screws with concave and convex teeth. Several chambers are formed between the surfaces of the two screws, and also between the surfaces of the two screws and the surface of the housing. In order to ensure a high degree of operating efficiency of these screw compressors, it is necessary that the mating surfaces of these screws and the housing are processed with high precision (with a roughness of the mating surfaces of up to 10 micrometers), which would rule out the possibility of the ingress of a compressible working medium into gaps formed between the mating surfaces. In order to reduce the leakage of compressible working medium in these compressors, it is necessary to increase the turning of the screws, which would, by means of speed, compensate for leakage in the compressor. However, this leads to rapid failure of the compressors. Moreover, these compressors cannot compress the working medium up to high pressures since the mating surfaces are heated, as a result of which jamming of the screws takes place.

Similar problems are encountered in piston compressors comprising three mating solids: a piston, a cylindrical housing and a crankshaft. In these compressors, there is also the problem of the leakage of working medium entering gaps between piston rings.

Similar problems are also encountered in spiral compressors comprising two mating solids in the form of planar spiral screws. Furthermore, one spiral screw is rigidly fixed in a housing, and the other spiral screw is capable of moving with eccentricity around the centre of the first screw. In these compressors, there is also the problem of the leakage of working medium entering gaps between mating elements of the compressor.

Apart from the abovementioned complex geometric solids, there is a plurality of other geometric solids which mate with one another as they move and which have surfaces which need to be processed with high precision (with a roughness of the mating surfaces of up to 10 micrometers), which rules out the possibility of the formation of gaps between these surfaces, and consequently also the possibility of the ingress of working medium into these gaps during use of said geometric solids.

For example, the application WO 8706654 describes a rotary device for compressing gas in refrigerators.

This device comprises an electric motor having a rotor, which is mounted rotatably within a stator. The motor has a hermetically sealed cover and a number of spring elements. A compressor comprising two conical screws which mate with one another during use and which directly compress a gaseous medium and have surfaces which mate with one another as they move relative to one another is mounted in the rotor. Furthermore, each screw of the pair of conical screws has a complex shape which is delimited by the complex helical toothed surface. One of the conical screws, during use, performs a complex epicycloidal planetary movement inside the other conical screw. Furthermore, the description of the application mentions that, in order to perform this movement, each of these screws needs to have a surface which is processed with a high degree of accuracy in order to ensure snug mating of these screws without any gaps as they move relative to one another during use. However, the description of this application does not mention how the described conical screws having the surfaces processed in the mentioned way are produced.

The inventors of the proposed invention have studied in detail the structural features of these screws described in the application WO 8706654 and have conducted research into the subject of the manufacture of these screws. As a result of the work and experiments which have been performed, the inventors have drawn the conclusion that at present there is no possible way of manufacturing a complex surface of the mating solids with a high precision which ensures snug mating of these solids without any gaps as they move relative to one another during use.

When conducting their tests and experiments, the inventors of the proposed invention have discovered that the manufacture of said screws by hand is impossible owing to the high degree of complexity of the three-dimensional geometric shape of the surface delimiting each of these screws and the stringent requirements in respect of the accuracy of the processing of this surface.

The tests conducted using machine tools with NC for producing surfaces of the screws with a high precision which ensures snug mating of these solids without any gaps have demonstrated that, in order to produce surfaces processed with this accuracy, it is necessary to develop individual complex programs functioning on the basis of determined mathematical laws, in accordance with which each specific machine tool will process a specific surface of a specific article.

However, the inventors of the proposed invention have discovered that at present there are no generally known laws for processing the surfaces of these solids with high precision which ensures snug mating of these solids without any gaps.

Furthermore, it has been discovered that, over the course of many years, screw compressors comprising two conical screws which mate with one another as they move relative to one another during use have been significantly improved in terms of construction and technology, but until now this type of compressor machine is sufficiently difficult to manufacture since special high-accuracy technology for manufacturing conical helical solids with a surface roughness of up to 10 micrometers is required.

At present there are a number of patents which describe the use of conical rotary compressors. However, not a single patent is known to us that describes the production of conical rotary compressors.

This can be explained by the fact that mating geometric solids of conical rotary compressors have a very complex conical toothed surface, the movement of these solids relative to one another during use is performed in accordance with the hypocycloidal law and, consequently, the mating of conical screws as they move relative to one another during use comprises complex meshing of two conical screw surfaces performing a planetary movement along a complex trajectory.

Therefore, the problem of producing mating geometric solids of conical rotary compressors consists in the complexity of the surfaces of these solids and the absence of a generally known mathematical expression describing the generatrix of the profiles of the surfaces of the mating geometric solids on a plane perpendicular to the axis of a conical semifinished product of a corresponding geometric solid.

Furthermore, it should be noted that at present there are machine tools with NC ("Tekhnologiya kompressorostroeniya" N. A. Yastrebova, A. I. Kondakov, V. D. Lubenets, A. N. Vinogradov, Moscow, "Mashinostroenie" 1987, pages 92-113, paragraph 9 "Manufacture of rotors for screw compressors") for manufacturing cylindrical helical solids consisting of solid-forged semifinished steel products which ensure a surface roughness which, as the cylindrical helical solids move relative to one another during use, produces gaps along the lines of contact between the screws and the housing in the range of from 0.05 mm to 0.1 mm and between the screws and the lateral covers of the housing in the range of from 0.1 mm to 0.25 mm. That is to say that said machine tools do not ensure a surface roughness of up to 10 micrometers along the lines of contact between two mating helical solids having a complex shape which is limited by the complex helical toothed surface as they move relative to one another during use.

It follows from this that in the rotary device for compressing gas in refrigerators described in the application WO 8706654, there is the problem of efficiency since at present there are no machine tools which ensure the possibility of manufacturing surfaces of two mating conical helical solids with a surface roughness of up to 10 micrometers which ensures snug mating of these solids without any gaps as they move relative to one another during use.

However, we would like to draw attention to the fact that this type of compressor is very effective, and therefore there is a great demand for these compressors.

From this follows the problem associated with the production of geometric solids which mate with one another as they move relative to one another during use and which have a complex surface shape and a surface roughness of up to 10 micrometers along the lines of contact between the mating solids.

A device and a method for using a computer graphics system for deforming the shape of the surface of models of geometric solids by automatic geometric construction of models of geometric solids for subsequent production of said geometric solids are known from the U.S. Pat. No. 8,112,256.

In practice, the geometric solids (objects) are manufactured by connecting small objects to form large objects. The fixed arrangement of these objects together comprises complex initial movements of a large quantity of separate small objects. Moreover, the fixed mounting of these objects together comprises a combination of physical interactions which are dependent not only on the objects themselves, but also on the topology of the overall structure and the mutual arrangement which the objects assume within this topology.

This device and this method solve the problem of constructing models of three-dimensional objects using computer graphics, such as urban agglomerations comprising buildings and building complexes, industrial enterprises and electricity plants, oil derricks, aircraft, automobiles, trains, ships, satellites and airships, microchips, nanotechnological structures and the like for subsequent production thereof.

That is to say that this patent describes a method and a device for automatically designing a fixed arrangement of separate objects in an overall structure of entire objects in such a way that the objects are combined with one another without the use of a user interface, for example a keyboard or a monitor. This method and this device make it possible for a user to produce a design of large objects with different variants for the mutual fixed arrangement of the small objects contained within them.

This method can be implemented in the device with the aid of any known computer graphics system suitable for implementing the steps in this method.

As a rule, any graphics system of a conventional computer can be controlled with the aid of this method.

This device comprises a central processor capable of generating a plurality of bases in a coordinates reading system, each of which bases comprises a local system of coordinates. The central processor is connected to an initializer and an information input means (keyboard or any other known information input means).

This processor is capable of producing a corresponding model of a geometric solid in a local system of coordinates of each of the plurality of bases according to at least one mathematical law having a variable of a representative of a corresponding base, wherein each model of the geometric solid of the content has a shape which is dependent on the value of the variable of the representative of the corresponding base in which it is located, wherein the shape of the models of the geometric solid changes from base to base in accordance with the values of the variables.

The central processor has an external memory, which comprises programmed instructions with the aid of which the processor automatically implements some of the steps in the proposed method, and an internal memory, which comprises certain data input by the user and/or intermediate results which the processor requires for its operation.

The programmed instructions which are input into the external memory of the central processor comprise a program for storing input data and a mathematical law which has a variable of a representative of a corresponding base and ensures the production of the shape of each model of the geometric solid of the content, which shape is dependent on the value of the variable of the representative of the corresponding base in which it is located, wherein the shape of the models of the geometric solid changes from base to base in accordance with the values of the variables.

Moreover, the device comprises a graphical monitor and an information input means, which are connected to the central processor. Models of the geometric solid during the design process are visualized on the monitor.

This method and this device make it possible for a user to produce models of designs of large objects with different variants for the mutual fixed arrangement of the small objects contained within them.

However, they do not provide the possibility of producing models of objects which mate with one another as they move relative to one another during use.

In connection with this, there remains the unresolved problem of providing the possibility of manufacturing complex geometric solids having a complex shape of mating surfaces processed with a precision (with a surface roughness of up to 10 micrometers) which ensures snug mating of these solids without any gaps as they move relative to one another during use.

A method and a device for using a computer graphics system for changing the shape of the surface of a model of a geometric solid with the aid of deformation are known from the U.S. Pat. No. 4,821,214. This method and this device are used for designing models of geometric solids, that is for applying a computer graphics system for changing the shape of the surface of models of geometric solids with the aid of deformation. This method and this device can be used for producing a deformed shape of models of geometric solids which permanently mate with one another during use.

This method can be implemented in this device with the aid of any known computer graphics system suitable for implementing the steps in this method.

As a rule, any graphics system of a conventional computer can be controlled with the aid of this method.

This device comprises a central processor, which is connected to an initializer and an information input means (keyboard or any other known information input means).

The central processor has an external memory, which comprises programmed instructions with the aid of which the processor implements some of the steps in the proposed method, and an internal memory, which comprises certain data or intermediate results which the processor requires for its operation.

The programmed instructions which are input into the external memory of the central processor comprise a program for storing input data and a control-point grid for controlling deformations of semifinished products of models of geometric solids.

Moreover, the device comprises a graphical monitor which is connected to the information input means and to the central processor. A model of a geometric solid during the design process is visualized on the monitor.

This method for using a computer graphics system for changing the shape of models of geometric solids with the aid of deformation comprises the following steps: inputting into a processor and storing several characteristics defining the geometry of the shape of the surface of a model of a semifinished product of a first geometric solid in a global system of coordinates; inputting into the processor and storing several characteristics defining the geometry of the shape of the surface of a model of a semifinished product of a second geometric solid in a local system of coordinates; producing geometric data for each point on the surface of the model of the semifinished product of the first geometric solid in the global system of coordinates and geometric data for each point on the surface of the model of the semifinished product of the second geometric solid in the local system of coordinates; constructing a model of the semifinished product of the first geometric solid in the global system of coordinates on the basis of the geometric data produced, with the aid of the processor in response to a user command; applying a deformation to the model of the semifinished product of the first geometric solid by changing the shape of the surface of the model of the semifinished product of the first geometric solid with the aid of Boolean logic until the deformed target shape of the model of the first geometric solid is produced; constructing a model of the semifinished product of the second geometric solid in the local system of coordinates on the basis of the geometric data produced, with the aid of the processor in response to a user command; applying a deformation to the model of the semifinished product of the second geometric solid by changing the shape of the surface of the model of the semifinished product of the second geometric solid with the aid of Boolean logic until the deformed target shape of the model of the second geometric solid is produced.

Prior to implementing this method, the user sets a geometric solid for which a model needs to be designed and also determines the shape of the semifinished product which needs to be deformed in order to produce this geometric solid.

The semifinished product used can be a solid having any desired shape for which there is at present a mathematical law which describes the surface of this solid.

Then, the user initially calculates geometric data defining the semifinished product of the solid-state geometric solid relative to the global system of coordinates on the basis of known mathematical laws.

Furthermore, the shape of the model of the semifinished product of the geometric solid comprises a generally known figure, for example a cube, a parallelepiped, a sphere, a cone, a torus, a prism, a capsule, an icosahedron, an octahedron or similar geometric figures.

Then, for example, with the aid of an initializer of the computer graphics system, the central processor is brought into action and the user uses the keyboard to input the calculated geometric data relating to the semifinished product into the central processor. The central processor writes the input geometric data to the internal memory, and then constructs a semifinished product of the geometric model which needs to be deformed with the aid of this method.

In this patent, the expression "geometric data" refers to data which are input and stored in the processor in order to define any geometric model in relation to the global system of coordinates. Geometric data can include data of several points for which the coordinates are expressed in terms of the global system of coordinates or data with any function which defines parametric curves or the shape of the surface of a geometric model expressed in terms of the coordinate axes of the global system of coordinates.

Then, the user uses the keyboard to input into the processor and to store a local system of coordinates which defines a region of deformation of the model and lays a control-point grid over part of the model in the deformation region for controlling the deformation of this part of the model.

After this, the user performs, manually with the aid of the processor, the deformation of the model in the deformation region by means of manually shifting one of the control points relative to another control point in the grid, produces geometric data of the shifted control points in the processor and uses the processor to convert the geometric data produced of the shifted control points in such a way that they are expressed in terms of the local system of coordinates. After this, the user determines that part of the geometric data produced which is in the deformation region.

When the geometric model is deformed during the design process, the deformation steps can be displayed on a monitor. The finished deformed target model can be stored in the internal memory of the central processor and output to an external storage device, for example a magnetic strip storage device or the output of a printer/plotter, solid-state storage device or other similar means.

Then, the user uses the processor to determine and store the geometric data of the deformed position of the deformed model produced in the deformation region, thereby using the law of deformation for the converted geometric data determined in the deformation region.

In order to display the geometric data produced from the local system of coordinates in the global system of coordinates, the law of deformation is used which is a trivariate vector rational polynomial, in which each moved control point is a coefficient of the polynomial.

Then, the user uses the processor to display the deformed target model in correspondence to the deformation of each moved control point on the graphical monitor.

After this, the user uses the processor to classify the several points within the global system of coordinates for determining and storing the moved points which are located on the surface of, beyond the bounds of and within the deformed solid-state model.

In order to permanently combine the displayed deformed solid-state model with one or more other models, the user uses the keyboard to input into the internal memory of the processor and to store therein additional geometric data which define other solid-state models, whereupon the user manually, with the aid of the processor, subsequently changes the shape of the displayed model by means of Boolean logic.

The term "Boolean logic" should in this case be understood to mean the removal of part of one of the models of the solid-state geometric solids at the point of intersection (interference) of two solid-state models of geometric solids.

This method and this device make it possible to produce models of fixed geometric solids having surfaces with any complexity by manually moving, with the aid of a processor, points on the surface of a model to be deformed that correspond to control points in the grid.

However, said method and said device do not provide the possibility of producing models of geometric solids which mate with one another during use as they move relative to one another.

In this connection, there remains the unresolved problem of providing the possibility of manufacturing geometric solids having a complex shape of mating surfaces which are processed with a precision (with a surface roughness of up to 10 micrometers) which ensures snug mating during use of these solids without any gaps as said solids move relative to one another.

This can be explained in that all of the movements of the points on the surface of the model being deformed which correspond to the control points in the grid are performed manually by the user and there is no generally known law which makes it possible to define the specific position of each point being moved.

Moreover, when laying the control-point grid on the surface of the model to be deformed, clearances remain on this surface between the control points which are not subjected to point deformation, but which are deformed on the basis of the residual-effect principle, that is without any control.

Moreover, in relation to the fact that all of the movements of the control points are performed manually by the user, the user has no practical possibility of defining the specific position of each point on the surface defining the specific shape of the target model since it is physically impossible for the user to shift such a large number of control points as is necessary for producing high-precision mating surfaces in the production of geometric solids.

Therefore, when using this method and this device, there is no possibility of producing models of mating geometric solids having a complex shape of the mating surfaces which are processed with a precision (with a surface roughness of up to 10 micrometers) which ensures snug mating of these solids without any gaps as they move relative to one another during use.

DISCLOSURE OF THE INVENTION

The present invention is based on the problem of providing a method and a device for using a computer graphics system for changing the shape of the surface of models of geometric solids with the aid of deformation by such means and with such features as would make it possible to produce a deformed shape of the surface of models of geometric solids for the subsequent production thereof that would provide the possibility of producing geometric solids having a complex shape of mating surfaces processed with a precision (with a surface roughness of up to 10 micrometers) which ensures snug mating of the geometric solids without any gaps as they move relative to one another during use, which makes it possible to use the proposed invention, inter alia, for simplifying the production of conical screws of rotary screw compressors using standard equipment, for example a machine tool plant with program control already in existence in the industry at present.

This problem is solved by the provision of a method for using a computer graphics system for changing the shape of the surfaces of models of geometric solids with the aid of deformation, during which process, in accordance with the invention, deformed shapes of the surfaces of target models of at least a first and a second geometric solid, which geometric solids mate with one another during use as they move relative to one another, are produced for subsequent production of said geometric solids, which method, in accordance with the invention, is characterized in that the deformation of models of semifinished products of the at least first and second geometric solids is performed with the aid of a model of a corresponding tool; the model of the at least one first tool is used as the model of the tool for producing the deformed shape of the surface of a target model of the first geometric solid; geometric data for each point on a directrix and geometric data for each point on a generatrix, which directrix and generatrix form a surface defining the shape of the model of the first tool, are automatically calculated with the aid of a processor in response to a user command using several mathematical laws, each of which is a polynomial in which at least one of the coefficients represents one of several characteristics defining the geometry of the shape of the surface of the second geometric solid; the deformation of the model of the semifinished product of the first geometric solid is performed with the aid of the processor in response to a user command by moving, relative to one another, the model of the at least one first tool and the model of the semifinished product of the first geometric solid in accordance with a law for a movement imitating the movement during use of the first geometric solid, which mates with the second geometric solid as they move relative to one another, by introducing the model of the at least one first tool into the model of the semifinished product of the first geometric solid, and by changing the shape of the surface of the model of the semifinished product of the first geometric solid with the aid of Boolean logic until a deformed shape of the surface of the target model of the first geometric solid is produced; the target model of the first geometric solid, said target model having the deformed shape of the surface, is used as the model of the second tool for producing a deformed shape of the surface of a target model of the second geometric solid; the deformation of the model of the semifinished product of the second geometric solid is performed with the aid of the processor in response to a user command by moving, relative to one another, the model of the second tool and the model of the semifinished product of the second geometric solid in accordance with a law for a movement imitating the movement during use of the second geometric solid, which mates with the first geometric solid as they move relative to one another, by introducing the model of the at least one second tool into the model of the semifinished product of the second geometric solid, and by changing the shape of the surface of the model of the semifinished product of the second geometric solid with the aid of Boolean logic until the deformed shape of the surface of the target model of the second geometric solid is produced; the geometric data for each point on the surface defining the deformed shape of the surface of the target model of the first geometric solid and the deformed shape of the surface of the target model of the second geometric solid, respectively, are determined and stored with the aid of the processor in response to a user command.

The proposed method makes it possible to model geometric solids which mate with one another during use as they move relative to one another and which have, inter alia, a complex shape of the mating surfaces, and then to manufacture each of these solids with a roughness of the mating surfaces of up to 10 micrometers.

This is explained in that, in the proposed method, the deformation is performed by moving the models in accordance with a law imitating the movement of the geometric solids which mate with one another during use, as a result of which the possibility of producing precision of the surfaces of the first and second geometric solids and the possibility of said geometric solids mating with one another without any gaps as they move relative to one another during use are provided.

Moreover, the proposed method makes it possible to produce complete and accurate geometric data relating to each point on the surface of each mating solid, which geometric data provide the possibility of manufacturing mating geometric solids having, inter alia, a complex shape of the mating surfaces processed with a precision (with a surface roughness of up to 10 micrometers) which ensures snug mating of the geometric solids without any gaps as they move relative to one another during use.

This makes it possible to use the proposed invention, inter alia, for simplifying the production of conical screws of rotary screw compressors using standard equipment, for example a machine tool plant with program control already in existence in the industry at present.

It is expedient for the proposed method to include the following steps: inputting into the processor and storing several characteristics defining the geometry of the shape of the surface of the first geometric solid in a first system of coordinates with the start of the coordinates at point O; inputting into the processor and storing several characteristics defining the geometry of the shape of the surface of the model of the semifinished product of the first geometric solid in the first system of coordinates; inputting into the processor and storing several characteristics defining the geometry of the shape of the surface of the second geometric solid, which mates with the first geometric solid during use as they move relative to one another, in a second system of coordinates with the start of the coordinates at point A; inputting into the processor and storing several characteristics defining the geometry of the shape of the surface of the model of the semifinished product of the second geometric solid in the second system of coordinates; inputting the into the processor and storing several mathematical laws for the automatic calculation, on the basis of the several characteristics, of the geometric data for each point on the surface of the model of the semifinished product of the first geometric solid in the first system of coordinates and the geometric data for each point on the surface of the model of the semifinished product of the second geometric solid in the second system of coordinates; inputting into the processor and storing the several mathematical laws for the automatic calculation of the geometric data for each point on the directrix and the geometric data for each point on the generatrix, which directrix and generatrix form the surface defining the shape of the model of the at least one first tool, wherein each of the several mathematical laws represents the polynomial in which at least one of the coefficients represents one of the several characteristics defining the geometry of the shape of the surface of the second geometric solid in the second system of coordinates; producing, by means of the automatic calculation, with the aid of the processor, in response to a user command, the geometric data for each point on the surface of the model of the semifinished product of the first geometric solid in the first system of coordinates and the geometric data for each point on the surface of the model of the semifinished product of the second geometric solid in the second system of coordinates; constructing, on the basis of the geometric data produced, with the aid of the processor, in response to a user command, the surface of the model of the semifinished product of the first geometric solid in the first system of coordinates; producing, by means of the automatic calculation, with the aid of the processor, in response to a user command, the geometric data for each point on the directrix and the geometric data for each point on the generatrix, which directrix and generatrix form the surface defining the shape of the model of the at least one first tool, which has at least part of the surface imitating at least part of the surface of the second geometric solid; constructing, on the basis of the geometric data produced, with the aid of the processor, in response to a user command, the surface defining the shape of the model of the at least one first tool for controlling the deformation of the model of the semifinished product of the first geometric solid in the second system of coordinates; applying a deformation to the model of the semifinished product of the first geometric solid with the aid of the processor in response to a user command by moving, relative to one another, the model of the at least one first tool and the model of the semifinished product of the first geometric solid in accordance with a law for a movement imitating the movement during use of the first geometric solid, which mates with the second geometric solid as they move relative to one another, by introducing the model of the at least one first tool into the model of the semifinished product of the first geometric solid, and by changing the shape of the surface of the model of the semifinished product of the first geometric solid with the aid of Boolean logic until the deformed shape of the surface of the target model of the first geometric solid is produced, which deformed shape has the several characteristics defining the geometry of the shape of the surface of the first geometric solid; determining and storing, with the aid of the processor, in response to a user command, the geometric data for each point on the surface defining the deformed shape of the surface of the target model of the first geometric solid in the first system of coordinates; constructing, on the basis of the geometric data produced, with the aid of the processor, in response to a user command, the surface of the model of the semifinished product of the second geometric solid in the second system of coordinates; using the target model of the first geometric solid having the deformed shape of the surface as the second tool for producing the deformed shape of the surface of the target model of the second geometric solid; applying a deformation to the model of the semifinished product of the second geometric solid, with the aid of the processor, in response to a user command, by moving, relative to one another, the model of the second tool and the model of the semifinished product of the second geometric solid in accordance with a law for a movement imitating the movement during use of the second geometric solid, which mates with the first geometric solid as they move relative to one another, by introducing the model of the second tool into the model of the semifinished product of the second geometric solid, and by changing the shape of the surface of the model of the semifinished product of the second geometric solid with the aid of Boolean logic until the deformed shape of the surface of the target model of the second geometric solid is produced, which deformed shape has the several characteristics defining the geometry of the shape of the surface of the second geometric solid; determining and storing, as mentioned, with the aid of the processor, in response to a user command, the geometric data for each point on the surface defining the deformed shape of the surface of the target model of the second geometric solid in the second system of coordinates.

Implementing these steps ensures the production, by the processor, of geometric data for each point on the surface of models of semifinished products of geometric solids in corresponding systems of coordinates; the production of a model of a first tool with precision in respect of the surface; deformation using a procedure imitating the mating of two manufacture of complex surfaces of a first and a second solid with a precision which makes it possible for them to mate as they move relative to one another during use without any gaps; constructing a surface, with precision accuracy, of models of semifinished products of a first and a second solid in corresponding systems of coordinates; producing precision accuracy of the surface of a first solid and providing the possibility of said solid mating with a second solid without any gaps owing to the fact that, during the deformation process, the movement of two mating solids relative to one another during use is imitated.

As a result of the above-described steps, the possibility is provided of producing two or more functional geometric solids which mate with one another as they move relative to one another during use and which have precision accuracy of the mating surfaces and the possibility of said geometric solids mating with one another without any gaps as they move relative to one another.

In order to produce a first and a second geometric solid using machine tools with NC so as to provide the possibility of producing precision accuracy of the mating surfaces of said geometric solids and the possibility of said geometric solids mating with one another without any gaps as they move relative to one another during use, it is desirable for the geometric data for each point on the surface defining the deformed shape of the surface of the target model of the first geometric solid in the first system of coordinates and the geometric data for each point on the surface defining the deformed shape of the surface of the target model of the second geometric solid in the second system of coordinates to be output to the input of a numerical control means of a device for producing geometric solids.

In order to save on the amount of time spent on producing the geometric data, it is expedient for the model of each of the semifinished products to have dimensions which make it possible to insert the corresponding target model of the corresponding geometric solid into each corresponding model of the semifinished product.

In order to provide the possibility of the user visually observing the process of producing deformed shapes of models of geometric solids which mate with one another during use, the following steps are preferably additionally implemented: using the processor to display, in response to a user command, the surface of the model of the semifinished product of the first solid in the first system of coordinates; using the processor to display, in response to a user command, the model of the at least one first tool in the second system of coordinates; using the processor to display, in response to a user command, the surface of the deformed target model of the first solid in the first system of coordinates; using the processor to display, in response to a user command, the surface of the model of the semifinished product of the second solid in the second system of coordinates; using the processor to display, in response to a user command, the surface of the deformed target model of the second geometric solid in the second system of coordinates.

In order to facilitate the construction of semifinished products it is favourable if a model of a geometric solid having a simple surface shape is selected as each of the first and second semifinished products.

For economic use of the proposed method, it is appropriate to select a geometric solid having a complex surface shape as each geometric solid.

In order to produce deformed target shapes of the models of the first and second geometric solids, which mate with one another during use and comprise conical screws of rotary screw compressors and have a precision accuracy of the mating surfaces which ensures that there are no gaps as these solids mate with one another as they move relative to one another during use, a first conical screw is selected as the first geometric solid; a second conical screw which has one tooth more than the first conical screw is selected as the second geometric solid, which mates with the first geometric solid as they move relative to one another during use; at least the length, the maximum diameter, the minimum diameter, the number of turns of the spiral toothed surface, the number of teeth, and the height of each tooth of the first conical screw are introduced as the several characteristics defining the geometry of the shape of the surface of the target model of the first conical screw; at least the height and diameter of each base of a first truncated cone are introduced as the several characteristics defining the geometry of the shape of the surface of the model of the semifinished product of the first conical screw; the length, the maximum diameter, the minimum diameter, the number of turns, the number of teeth and the height of each tooth of the second conical screw are introduced as the several characteristics defining the geometry of the target model of the second conical screw; a conical spiral is used as the directrix, which forms the surface defining the shape of the model of the at least one first tool; a circle is used as the closed generatrix, which forms the surface defining the shape of the model of the at least one first tool; a first polynomial:

$$\begin{cases} X_1 = F_1(t) \\ Y_1 = F_2(t), \\ Z_1 = F_3(t) \end{cases} \quad (1)$$

where:

$X_1$ is the coordinate of each point on the conical spiral along the axis X in the second system of coordinates;

$Y_1$ is the coordinate of each point on the conical spiral along the axis Y in the second system of coordinates;

$Z_1$ is the coordinate of each point on the conical spiral along the axis Z in the second system of coordinates;

$F_1$ is the function of the coordinate along the axis X in dependence on the parameter of the polynomial comprising the coefficient which represents one of the several characteristics defining the geometry of the shape of the surface of the target model of the second conical screw in the second system of coordinates;

$F_2$ is the function of the coordinate along the axis Y in dependence on the parameter of the polynomial comprising the coefficient which represents one of the several characteristics defining the geometry of the shape of the surface of the target model of the second conical screw in the second system of coordinates;

$F_3$ is the function of the coordinate along the axis Z in dependence on the parameter of the polynomial comprising the coefficient which represents one of the several characteristics defining the geometry of the shape of the surface of the target model of the second conical screw in the second system of coordinates;

T is the parameter of the functions $F_1$, $F_2$, $F_3$;

is used as the corresponding polynomial which represents the corresponding law for the automatic calculation of the geometric data for each point on the conical spiral; a second polynomial:

$$Y_2 = G(X_2) \quad (2), \text{where:}$$

$X_2$ is the coordinate of each point on the circle along the axis X in the second system of coordinates;

$Y_2$ is the coordinate of each point on the circle along the axis Y in the second system of coordinates;

G is the function of the coordinate $Y_2$ along the axis Y in dependence on the coordinate $X_2$ along the axis X, which function comprises the coefficient representing one of the several characteristics defining the geometry of the shape of the surface of the target model of the second conical screw in the second system of coordinates;

is used as the corresponding polynomial which comprises the corresponding law for the automatic calculation of the geometric data for each point on the circle;

the geometric data for each point on the conical spiral and the geometric data for each point on the circle, which conical spiral and circle form the surface defining the shape of the model of the at least one first tool which has at least part of the surface which imitates at least part of the surface of the second conical screw, are produced as the geometric data for each point on the surface defining the shape of the model of the at least one first tool; the construction of the surface defining the shape of the model of the at least one first tool on the basis of the geometric data produced with the aid of the processor in response to a user command is performed in order to control the deformation of the first truncated cone in the second system of coordinates; the movement, relative to one another, of the model of the at least one first tool produced and the first truncated cone is performed on the basis of a law for a cycloidal movement which imitates the movement of the first conical screw, which mates with the second conical screw as they move relative to one another during use; a deformed model of the first conical screw is produced as the deformed target model of the first solid, said deformed target model having the several characteristics; geometric data for each point on the surface defining the deformed model of the first conical screw are determined and stored as the geometric data for each point on the surface defining the deformed target shape of the model of the first solid; at least the height and diameter of each base of the second truncated cone are introduced as the several characteristics defining the geometry of the shape of the surface of the model of the semifinished product of the second conical screw; the deformed model of the first conical screw is used as the model of the at least one second tool; the movement, relative to one another, of the model of the second tool and the second truncated cone is performed in accordance with a law for a cycloidal movement which imitates the movement of the second conical screw, which mates with the first conical screw as they move relative to one another during use; the deformed model of the second conical screw is produced as the deformed target model of the second solid, said deformed target model having the several characteristics; geometric data for each point on the surface defining the deformed model of the second conical screw are determined and stored as the geometric data for each point on the surface defining the deformed target shape of the model of the second solid.

This problem is also solved by the provision of a device for using a computer graphics system for changing the shape of the surfaces of models of geometric solids with the aid of deformation and producing a deformed shape of the surfaces of target models of at least a first and a second geometric solid, which geometric solids mate with one another during use as they move relative to one another, for subsequent production of said geometric solids, said device comprising: a central processor, which has, connected to one another, an internal memory and an external memory and which is capable of receiving, processing and storing updated and long-term information; an information input means, which is connected to the central processor; an information output means, which is connected to the central processor, wherein, in accordance with the invention, the proposed device is intended for producing a deformed shape of the surfaces of the target models of at least the first and second geometric solids, which mate with one another during use as they move relative to one another, for the subsequent production of said geometric solids, and has the external memory of the central processor, which external memory comprises at least a program for storing input data, including:

a programmed law for the movement of the first geometric solid, which mates, during use, with the second geometric solid as they move relative to one another;

a programmed law for the movement of the second geometric solid, which mates with the first geometric solid as they move relative to one another during use;

several programmed laws for the construction of the surfaces of models of semifinished products of the first and second geometric solids in the corresponding systems of coordinates on the basis of the characteristics in response to a user command;

several programmed laws for the automatic calculation of geometric data for each point on a directrix and geometric data for each point on a generatrix, which directrix and generatrix form a surface defining the shape of a model of at least one first tool, wherein each of the laws is a polynomial in which at least one of the coefficients represents one of the several characteristics defining the geometry of the shape of the surface of the second geometric solid in the second system of coordinates;

the internal memory of the central processor, which internal memory contains certain data and/or intermediate results which the processor requires for its operation, including:

several characteristics defining the geometry of the shape of the surface of the first geometric solid in a first system of coordinates with the start of the coordinates at point O;

several characteristics defining the geometry of the shape of the surface of the model of the semifinished product of the first geometric solid in the first system of coordinates;

several characteristics defining the geometry of the shape of the surface of the second geometric solid in a second system of coordinates with the start of the coordinates at point A;

several characteristics defining the geometry of the shape of the surface of the model of the semifinished product of the second geometric solid in the second system of coordinates;

the central processor, which is capable of performing the following steps:

automatically calculating, in response to a user command, geometric data for each point on the surface which defines the geometry of the shape of the surface of the model of the semifinished product of the first geometric solid in the first system of coordinates;

automatically calculating, in response to a user command, geometric data for each point on the surface which defines the geometry of the shape of the surface of the model of the semifinished product of the second geometric solid in the second system of coordinates;

automatically calculating, in response to a user command, the geometric data for each point on the directrix and the geometric data for each point on the generatrix, which directrix and generatrix form the surface defining the shape of the model of the at least one first tool, which has at least part of the surface which imitates at least part of the surface of the second geometric solid;

constructing the surfaces of the models of the semifinished products of the first and second geometric solids in the corresponding systems of coordinates on the basis of the geometric data produced in response to a user command;

constructing the surface defining the shape of the model of the at least one first tool for controlling the deformation of the model of the semifinished product of the first geometric solid in the second system of coordinates on the basis of the geometric data produced in response to a user command;

applying a deformation to the model of the semifinished product of the first geometric solid in response to a user command by moving, relative to one another, the model of the at least one first tool and the model of the semifinished product of the first geometric solid in accordance with a law for a movement imitating the movement during use of the first geometric solid, which mates with the second geometric solid as they move relative to one another, by introducing the model of the at least one first tool into the model of the semifinished product of the first geometric solid, and by changing the shape of the surface of the model of the semifinished product of the first geometric solid with the aid of Boolean logic until the deformed shape of the surface of the target model of the first geometric solid is produced, which deformed shape has the several characteristics defining the geometry of the shape of the surface of the first geometric solid;

determining and storing, in response to a user command, geometric data for each point on the surface defining the deformed shape of the surface of the target model of the first solid in the first system of coordinates;

constructing the surface of the model of the semifinished product of the second geometric solid in the second system of coordinates on the basis of the characteristics in response to a user command;

using the target model of the first geometric solid which has the deformed shape of the surface as the second tool for controlling the deformation of the model of the semifinished product of the second geometric solid;

applying a deformation to the model of the semifinished product of the second geometric solid in response to a user command by moving, relative to one another, the model of the second tool and the model of the semifinished product of the second geometric solid in accordance with a law for a movement imitating the movement of the second geometric solid, which mates with the first geometric solid as they move relative to one another during use, by introducing the model of the at least one second tool into the model of the semifinished product of the second geometric solid, and by changing the shape of the surface of the model of the semifinished product of the second geometric solid with the aid of Boolean logic until the deformed shape of the surface of the target model of the second geometric solid is produced, which target model has the several characteristics defining the geometry of the shape of the surface of the hypothetical first geometric solid;

determining and storing, in response to a user command, geometric data for each point on the surface defining the deformed shape of the surface of the target model of the second geometric solid in the second system of coordinates.

The proposed device makes it possible to model geometric solids which mate with one another during use as they move relative to one another and which have, inter alia, a very complex shape of the mating surfaces, and then to manufacture each of these solids with a roughness of the mating surfaces of up to 10 micrometers.

This can be explained in that, in the proposed device, the deformation is performed by moving the models in accordance with a law imitating the movement of the geometric solids which mate with one another during use and, in the proposed device, the possibility of producing precision accuracy of the surfaces of the first and second geometric solids and the possibility of said geometric solids mating with one another without any gaps as they move relative to one another during use are provided.

Moreover, the proposed device makes it possible to produce complete and accurate geometric data relating to each point on the surface of each mating solid, which geometric data provide the possibility of manufacturing mating geometric solids having, inter alia, a very complex shape of the mating surfaces processed with a precision (with a surface roughness of up to 10 micrometers) which ensures snug mating of the geometric solids without any gaps as they move relative to one another during use.

This makes it possible to use the proposed invention, inter alia, for simplifying the production of conical screws of rotary screw compressors using standard equipment, for example a machine tool plant with program control which is already in existence in the industry at present.

In order to visually observe the process of producing deformed shapes of models of geometric solids which mate with one another during use, it is desirable for the proposed device to comprise a graphical monitor, which is connected to the information input means and to the central processor and is capable of visualizing the models of the geometric solids during the design process.

In order to produce a first and a second geometric solid on machine tools with NC so as to provide the possibility of producing precision accuracy of the mating surfaces thereof and the possibility of said geometric solids mating with one another without any gaps as they move relative to one another during use, it is expedient for the information output means to be connected to the input of a numerical control means of a device for producing the geometric solids.

BRIEF DESCRIPTION OF THE DRAWINGS

For improved understanding of the invention, specific examples are cited below with reference to the attached drawings, in which.

THE PROPOSED METHOD IS IMPLEMENTED IN THE FOLLOWING WAY

Figure 1:
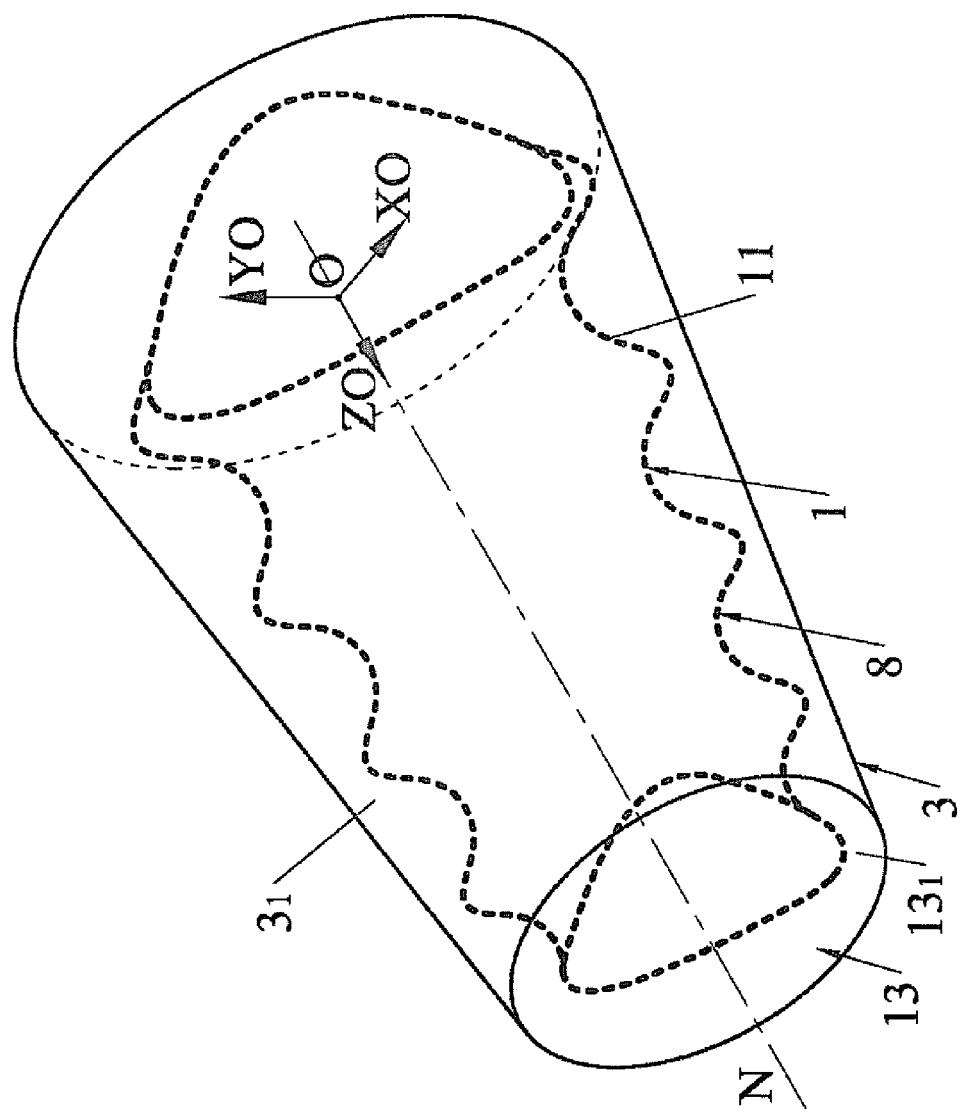
FIG. 1 shows a model of a first geometric solid, which model is arranged inside a model of a semifinished product of the first geometric solid, in accordance with the invention, isometric.

The proposed method for using a computer graphics system for changing the shape of the surface of models of geometric solids with the aid of deformation is intended for producing a deformed shape of models of geometric solids, which mate with one another as they move relative to one another during use, for the subsequent production of said geometric solids.

Prior to implementing the proposed method, the user sets the shape of at least a first geometric solid 1 (FIG. 1) and a second geometric solid 2 (FIG. 2), which need to be manufactured using the proposed method and which should mate with one another during use as they move relative to one another and have a precision accuracy of the mating surfaces with a surface roughness of up to 10 micrometers which ensures snug mating of these solids 1, 2 (FIGS. 1 and 2) without any gaps as they move relative to one another during use.

Using the proposed method, it is possible to produce, for example, two geometric solids 1, 2 which mate with one another during use as they move relative to one another and it is possible to produce several geometric solids (not shown in the drawing) which mate with one another during use as they move relative to one another. This is dependent on the specific device for which these geometric solids, for example geometric solids 1, 2, are intended.

Geometric solids having any desired surface shape can be used as the geometric solids 1, 2. For efficient use of the proposed method, geometric solids having a complex surface shape are selected as the geometric solids 1, 2, for example, conical screws of a rotary screw compressor unit, gear elements, gears of a gear pump and similar pairs of geometric solids which mate with one another as they move relative to one another during use.

The characteristics of the first geometric solid 1 are dependent on the characteristics of the second geometric solid 2, or vice versa, since these characteristics relate to two solids 1, 2 which will mate with one another during use as they move relative to one another once they have been produced.

Then, the user sets the geometry of the shape of the surface of the semifinished product 3 (FIG. 1) of the first geometric solid 1 and the geometry of the shape of the surface of the semifinished product 4 (FIG. 2) of the second geometric solid 2. When using a different number of geometric solids, a different number of semifinished products is used, which is equal to the number of geometric solids.

Figure 3:
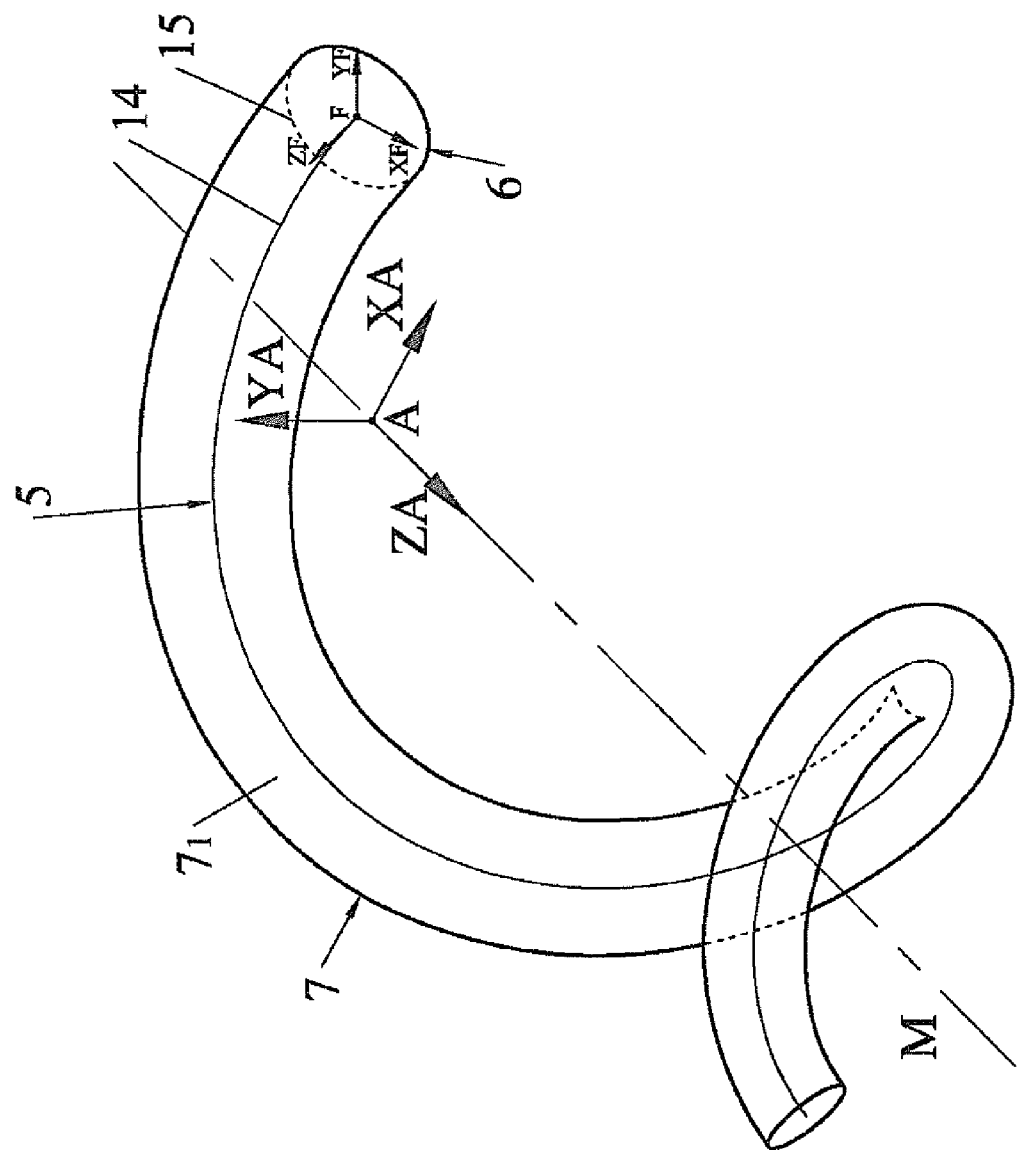
FIG. 3 shows a model of a first tool, in accordance with the invention, isometric.

After this, the proposed method is implemented, said method consisting in implementing the following steps:

inputting into the processor and storing several characteristics defining the geometry of the shape of the surface of the first geometric solid 1 in a first system of coordinates with the start of the coordinates at point O;

inputting into the processor and storing several characteristics defining the geometry of the shape of the surface of a model $3_1$ (FIG. 1) of a semifinished product 3 of the first geometric solid 1 in the first system of the coordinate;

inputting into the processor and storing several characteristics defining the geometry of the shape of the surface of the second geometric solid 2, which mates with the first geometric solid 1 during use as they move relative to one another, in a second system of coordinates with the start of the coordinates at point A;

inputting into the processor and storing several characteristics defining the geometry of the shape of the surface of a model $4_1$ (FIG. 2) of a semifinished product 4 of the second geometric solid 2 in the second system of coordinates;

inputting into the processor and storing several first mathematical laws for the automatic calculation, on the basis of the several characteristics, of the geometric data for each point on the surface of the model $3_1$ of the semifinished product 3 of the first geometric solid 1 in the first system of coordinates and the geometric data for each point on the surface of the model $4_1$ of the semifinished product 4 of the second geometric solid 2 in the second system of coordinates;

inputting into the processor and storing several second mathematical laws for the automatic calculation of the geometric data for each point on a directrix 5 (FIG. 3) and the geometric data for each point on a generatrix 6, which directrix and generatrix form the surface defining the shape of a model $7_1$, of at least one first tool 7.

Each of the several first mathematical laws is dependent on the shape of the geometric solids which mate with one another during use as they move relative to one another and comprises a known mathematical law. A specific exemplary embodiment of the proposed method for specific mating geometric solids 1, 2 is set forth below, with the corresponding mathematical laws being cited.

A number of models $7_1$ of the first tools 7 for producing a deformed shape of the surface of the target model of the first geometric solid 1 is dependent on the complexity of the shape of the surface of the geometric solids 1, 2.

The order in which the characteristics are input is irrelevant.

Figure 2:
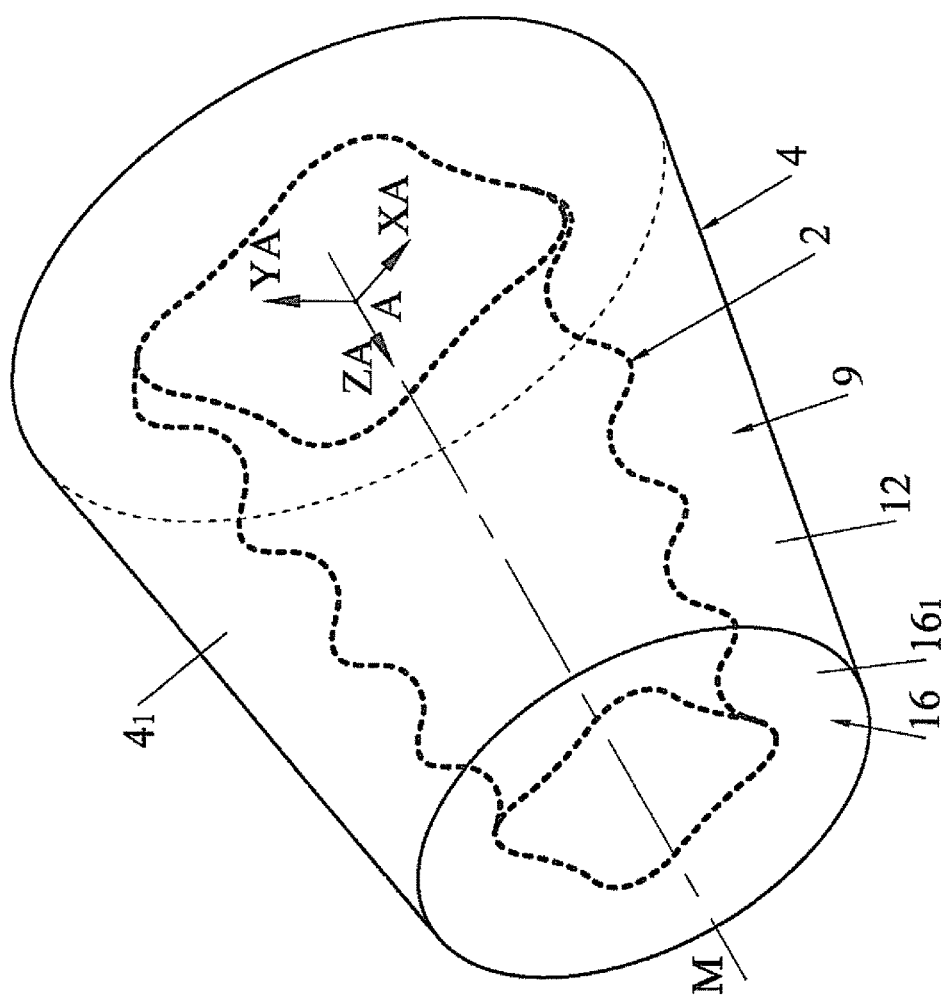
FIG. 2 shows a model of the second geometric solid, which model is arranged inside a model of a semifinished product of the second geometric solid, in accordance with the invention, isometric.

The arrangement of the first and second systems of coordinates is determined by determining the first start for the coordinates, for example at point O (FIG. 1), and the second start of the coordinates, for example at point A (FIG. 2). Points O and A can be arranged at any location in the region of the computer graphics system which makes it possible to create two systems of coordinates which are dependent on the movement, relative to one another, of geometric solids 1, 2 which mate with one another during use. For example, points O and A can lie on the longitudinal axes N and M of the corresponding models $3_1$, $4_1$ of the semifinished products 3, 4 of the first and second solids 1, 2, as shown in FIGS. 1 and 2.

From each point O and A, in each case three perpendicular vectors, XO, YO, ZO and XA, YA, ZA, respectively, which represent the corresponding axes of the coordinates of the first and second systems of coordinates, are established, and the corresponding first and second systems of coordinates are constructed.

The principle for the construction of the systems of coordinates will be described below in the description relating to a specific example.

To save time and ensure efficient use of the proposed method, the models $3_1$, $4_1$ of the semifinished products 3, 4 should at least remotely resemble the corresponding geometric solids 1, 2 (as illustrated in FIGS. 1 and 2) and should have dimensions which make it possible to insert the corresponding target model of the corresponding geometric solid 1, 2 into each corresponding model $3_1$, $4_1$ of the semifinished products 3, 4.

The selection of the several characteristics is dependent on the shape and parameters of the specific geometric solids 1, 2 of the specific devices.

Each of the several second mathematical laws represents a corresponding and known polynomial in which at least one of the coefficients represents one of the several characteristics defining the geometry of the shape of the surface of the second geometric solid 2 in the second system of coordinates.

This polynomial is dependent on the shape of the geometric solids which mate with one another during use as they move relative to one another and corresponds to a known mathematical formula which describes part of the surface of one of the mating solids.

A specific exemplary embodiment of the proposed method for specific mating geometric solids 1, 2 is set forth below, with examples of corresponding polynomials being cited.

Then, by automatic calculation with the aid of a processor in response to a user command, geometric data for each point on the surface of the model $3_1$ of the semifinished product 3 of the first geometric solid 1 in the first system of coordinates and geometric data for each point on the surface of the model $4_1$ of the semifinished product 4 of the second geometric solid 2 in the second system of coordinates are produced.

Furthermore, in this case the expression "geometric data" is intended to mean a complete description of the surface of any geometric solid 1, 2 with the aid of the coordinates of all of the points forming the surface of this geometric solid 1, 2.

Then, on the basis of the geometric data produced, the surface of the model $3_1$ of the semifinished product 3 of the first geometric solid 1 in the first system of coordinates is constructed with the aid of the processor in response to a user command.

Then, by automatic calculation with the aid of a processor in response to a user command, geometric data for each point on a directrix 5 and geometric data for each point on a generatrix 6, which directrix and generatrix form a surface defining the shape of a model $7_1$ of at least one first tool 7 having at least part of a surfaces which imitates at least part of the surface of the second geometric solid 2 are produced.

This is explained in that, when forming a model $7_1$ of at least one first tool 7, a known polynomial is used, in which at least one of the coefficients represents one of the several characteristics defining the geometry of the shape of the surface of the second geometric solid 2 in the second system of coordinates.

Then, the construction, on the basis of the geometric data produced, with the aid of the processor, in response to a user command, of the surface defining the shape of the model $7_1$ of the at least one first tool 7 for controlling the deformation of the model $3_1$ of the semifinished product 3 of the first geometric solid 1 in the second system of coordinates is performed.

Figure 4:
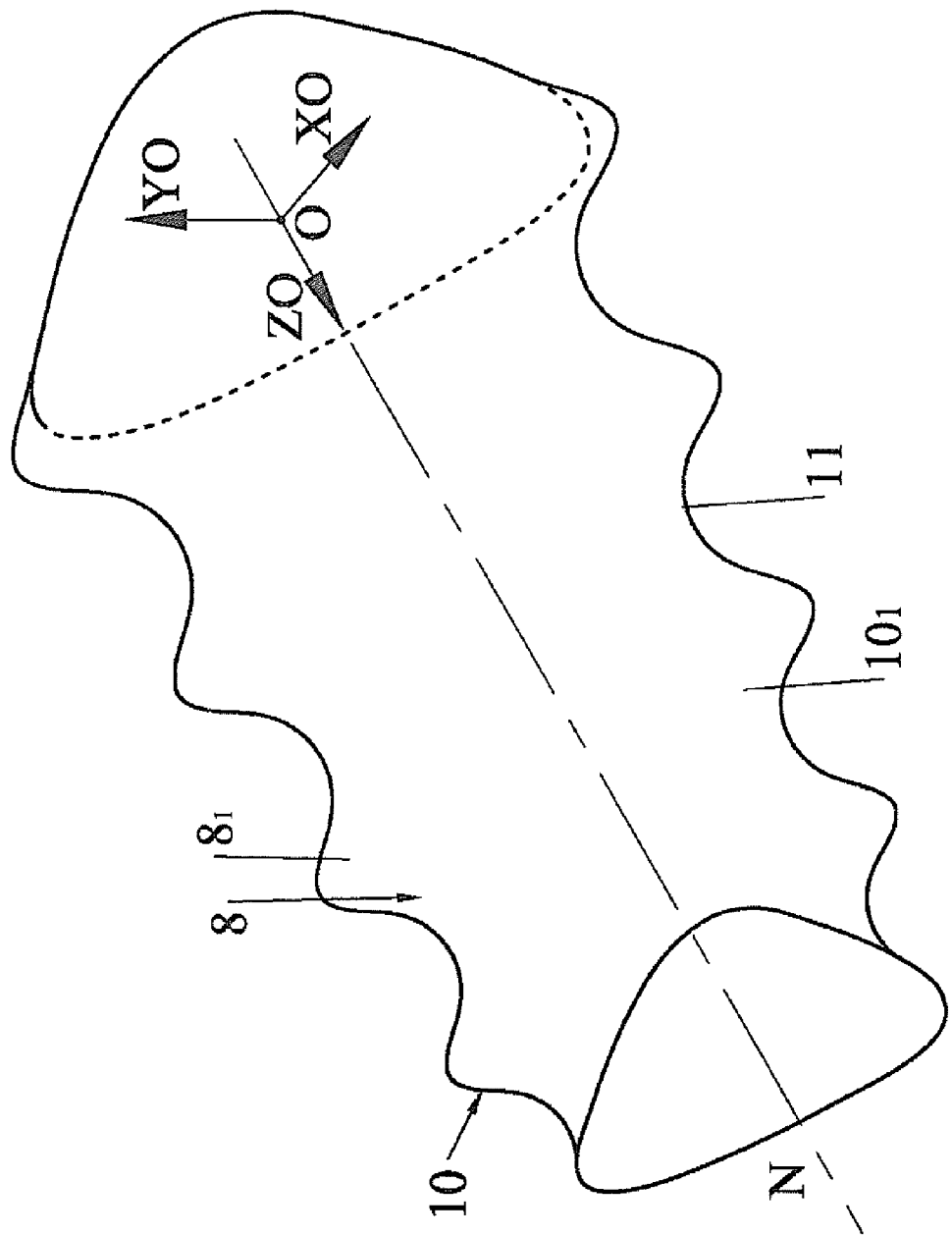
FIG. 4 shows the target model of the first geometric solid, which target model corresponds to a model of a second tool, in accordance with the invention, isometric.

After this, the application of a deformation to the model $3_1$ of the semifinished product 3 of the first geometric solid 1 with the aid of the processor, in response to a user command, by moving, relative to one another, the model $7_1$ of the at least one first tool 7 and the model $3_1$ of the semifinished product 3 of the first geometric solid 1 in accordance with a law for a movement imitating the movement during use of the first geometric solid 1, which mates with the second geometric solid 2 as they move relative to one another, by introducing the model $7_1$ of the at least one first tool 7 into the model $3_1$ of the semifinished product 3 of the first geometric solid 1, and by changing the shape of the surface of the model $3_1$ of the semifinished product 3 of the first geometric solid 1 with the aid of Boolean logic until the deformed shape of the surface of the target model 8 (FIGS. 1 and 4) of the first geometric solid 1 is produced, which deformed shape has the several characteristics defining the geometry of the shape of the surface of the first geometric solid 1, is performed.

Then, the determination and storage, with the aid of the processor, in response to a user command, of the geometric data for each point on the surface defining the deformed shape of the surface of the target model 8 of the first geometric solid 1 in the first system of coordinates are performed.

Then, the construction, on the basis of the geometric data produced, with the aid of the processor, in response to a user command, of the surface of the model $4_1$ of the semifinished product 4 of the second geometric solid 2 in the second system of coordinates is performed.

Figure 5:
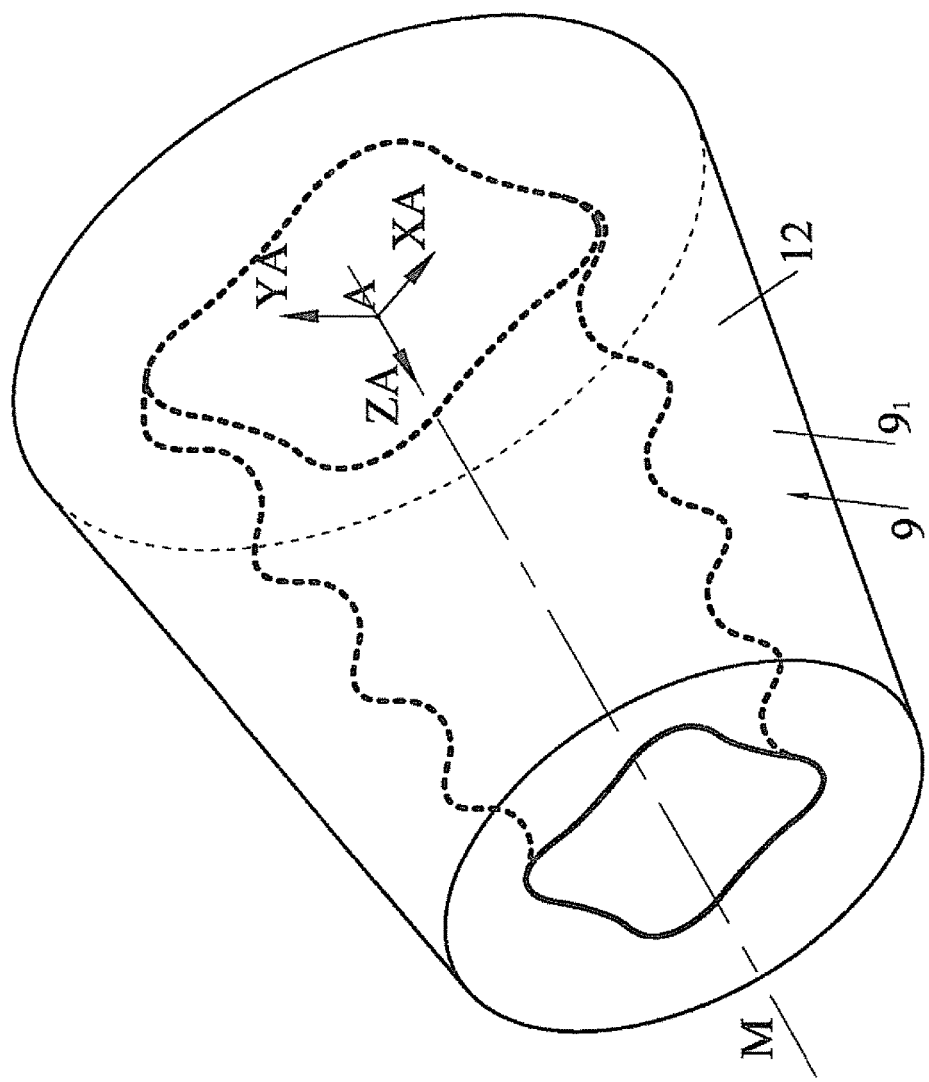
FIG. 5 shows the target model of the second geometric solid, in accordance with the invention, isometric.

The target model 8 of the first geometric solid 1, which target model has the deformed shape of the surface, is used as the model $10_1$ (FIG. 4) of the second tool 10 for producing the deformed shape of the surface of the target model 9 (FIGS. 2 and 5) of the second geometric solid 2.

After this, the application of a deformation to the model $4_1$ of the semifinished product 4 of the second geometric solid 2 with the aid of the processor, in response to a user command, by moving, relative to one another, the model $10_1$ of the second tool 10 and the model $4_1$ of the semifinished product 4 of the second geometric solid 2 in accordance with a law for a movement imitating the movement during use of the second geometric solid 2, which mates with the first geometric solid 1 as they move relative to one another, by introducing the model $10_1$ of the second tool 10 into the model $4_1$ of the semifinished product 4 of the second geometric solid 2, and by changing the shape of the surface of the model $4_1$ of the semifinished product 4 of the second geometric solid 2 with the aid of Boolean logic until the deformed shape of the surface of the target model 9 of the second geometric solid 2 is produced, which deformed shape has the several characteristics defining the geometry of the shape of the surface of the second geometric solid 2, is performed.

Then, the determination and storage, with the aid of the processor, in response to a user command, of the geometric data for each point on the surface defining the deformed shape of the surface of the target model 9 of the second geometric solid 2 in the second system of coordinates are performed.

All of the mentioned construction and movement operations are performed by any known method suitable for similar tasks.

Therefore, by virtue of implementing the proposed method, geometric data for each point on the surface defining the deformed shapes of the surfaces of the target models 8, 9 of the first and second geometric solids 1, 2, respectively, are automatically produced.

The proposed method makes it possible to solve the problem of the provision and simplification of the production of geometric solids which mate with one another as they move relative to one another during use and have a complex surface shape, for example gears, conical screws of a rotary screw compressor unit, gears of a gear pump and similar mating pairs of geometric solids.

Moreover, the proposed method makes it possible to produce mating geometric solids having a precision accuracy of the mating surfaces which rules out the possibility of the formation of gaps between the mating surfaces and which provides the possibility of high-precision mating of these solids during use.

Furthermore, the proposed method eliminates the need for the use of specialist machine tools for the production of each geometric solid and makes it possible to use a machine tool plant with NC which is already in existence at present for implementing the method.

In order to produce a first and a second geometric solid 1, 2 on machine tools with NC so as to provide the possibility of producing precision accuracy (with a surface roughness of up to 10 micrometers) of the mating surfaces of said geometric solids and the possibility of said geometric solids mating with one another without any gaps as they move relative to one another during use, geometric data for each point on the surface defining the deformed shape of the surface of the target model 8 of the first geometric solid 1 in the first system of coordinates and geometric data for each point on the surface defining the deformed shape of the surface of the target model 9 of the second geometric solid 2 in the second system of coordinates are output to the input of a numerical control means of a device (not shown in the drawing) for producing said geometric solids 1, 2.

In another variant embodiment of the present invention, geometric data for each point on the surface defining the deformed target shape of the model 8 of the first geometric solid 1 and geometric data for each point on the surface defining the deformed target shape of the model 9 of the second solid 2 can be output to a 3D printer or similar means or to an external storage device, for example a magnetic strip storage device or a solid-state storage device, for use for the subsequent production of the first and second geometric solids 1, 2.

In order for a user to visually observe the process for producing deformed shapes of target models 8, 9 of geometric solids 1, 2 which mate with one another during use, the following steps are additionally implemented: using the processor to display, in response to a user command, the surface of the model $3_1$ of the semifinished product 3 of the first solid 1 in the first system of coordinates; using the processor to display, in response to a user command, the model $7_1$ of the at least one first tool 7 in the second system of coordinates; using the processor to display, in response to a user command, the surface of the deformed target model 8 of the first solid 1 in the first system of coordinates; using the processor to display, in response to a user command, the surface of the model $4_1$ of the semifinished product 4 of the second solid 2 in the second system of coordinates; using the processor to display, in response to a user command, the surface of the deformed target model 9 of the second solid 2 in the second system of coordinates.

In order to facilitate the construction of models of semifinished products, a model of a geometric solid having a simple surface shape is selected as each model $3_1$, $4_1$ of the semifinished product 3, 4.

To ensure efficient use of the proposed method, a geometric solid having a complex surface shape is selected as each geometric solid 1, 2.

As has already been described above, the proposed method can be used for producing deformed target shapes of models of a first and a second geometric solid, which geometric solids comprise conical screws 11, 12 (FIG. 6) of rotary screw compressors having a conical helical spiral toothed surface, which is processed with a precision accuracy of the mating surfaces which ensures that there are no gaps when these solids mate with one another as they move relative to one another during use.

Consideration will now be given to an example of the proposed method in which a first conical screw 11 is selected as the first geometric solid, and a second conical screw 12 which has one tooth more than the first conical screw 11 is selected as the second geometric solid, which mates with the first geometric solid as they move relative to one another during use, wherein the model $7_1$ of one first tool 7 is used.

At least the length of the first conical screw 11, the maximum and minimum diameters of the first conical screw 11, the number of turns of the spiral toothed surface, the number of teeth of the first conical screw 11 and the height of each tooth of the first conical screw 11 are introduced as the several characteristics defining the geometry of the shape of the surface of the first conical screw 11. Furthermore, the characteristic of the roughness of this surface or any other characteristic selected, for example, from the group consisting of the characteristic of the spiral toothed surface (equal pitch or variable pitch) of the first conical screw 11, the average diameter of the spiral toothed surface of the first conical screw 11, the ratio of the maximum to the minimum diameter of this spiral toothed surface, the initial angle of inclination of this spiral toothed surface or length of the spiral toothed surface of the first conical screw 11, can additionally be introduced as the several characteristics defining the geometry of the shape of the surface of the first conical screw 11.

In other variant embodiments of the present invention for producing other mating geometric solids, several other characteristics specifically defining the geometry of the shape of the surface of these solids can be introduced as the several characteristics defining the geometry of the shape of the surface of the geometric solids.

At least the height and the diameter of each base of a first truncated cone 13 are introduced as the several characteristics defining the geometry of the shape of the surface of a model $13_1$ (FIG. 1) of the semifinished product of the first conical screw 11.

The length, the maximum diameter, the minimum diameter, the number of turns, the number of teeth and the height of each tooth of the second conical screw 12 are introduced as the several characteristics defining the geometry of the second conical screw 12.

A conical spiral 14 (FIG. 3), which represents a helical conical directrix which is constructed on the basis of the characteristics of the second solid 2, is used as the directrix 5, which forms the surface defining the shape of the model $7_1$ of the first tool 7.

A circle 15 (FIG. 3), which comprises a closed planar simple curve is used as the generatrix 6, which forms the surface defining the shape of the model 7₁ of the first tool 7.

A model of one first tool 7 is used in this example, but if necessary models of several first tools can be used.

The first polynomial:

$$\begin{cases} X_1 = F_1(t) \\ Y_1 = F_2(t) \\ Z_1 = F_3(t) \end{cases} \quad (1)$$

where:

$X_1$ is the coordinate of each point on the conical spiral 14 along the axis X in the second system of coordinates;

$Y_1$ is the coordinate of each point on the conical spiral 14 along the axis Y in the second system of coordinates;

$Z_1$ is the coordinate of each point on the conical spiral 14 along the axis Z in the second system of coordinates;

$F_1$ is the function of the coordinate along the axis X in dependence on the parameter of the polynomial comprising the coefficient which represents one of the several characteristics defining the geometry of the shape of the surface of the second conical screw 12 in the second system of coordinates;

$F_2$ is the function of the coordinate along the axis Y in dependence on the parameter of the polynomial comprising the coefficient which represents one of the several characteristics defining the geometry of the shape of the surface of the second conical screw 12 in the second system of coordinates;

$F_3$ is the function of the coordinate along the axis Z in dependence on the parameter of the polynomial comprising the coefficient which represents one of the several characteristics defining the geometry of the shape of the surface of the second conical screw 12 in the second system of coordinates;

T is the parameter of the functions $F_1$, $F_2$, $F_3$;

is used as the corresponding polynomial which represents the corresponding law for the automatic calculation of the geometric data for each point on the conical spiral 14.

The second polynomial:

$$Y_2 = G(X_2) \quad (2),\text{ where:}$$

$X_2$ is the coordinate of each point on the circle 15 along the axis X in the second system of coordinates;

$Y_2$ is the coordinate of each point on the circle 15 along the axis Y in the second system of coordinates;

G is the function of the coordinate $Y_2$ along the axis Y in dependence on the coordinate $X_2$ along the axis X, which function comprises the coefficient representing one of the several characteristics defining the geometry of the shape of the surface of the second conical screw 12 in the second system of coordinates is used as the corresponding polynomial which comprises the corresponding law for the automatic calculation of the geometric data for each point on the circle 15.

The geometric data for each point on the conical spiral 14 and the geometric data for each point on the circle 15, which conical spiral and circle form the surface defining the shape of the model 7₁ of the first tool 7 which has at least part of the surface which imitates at least part of the surface of the second conical screw 12, are produced as the geometric data for each point on the surface defining the shape of the model 7₁ of the first tool 7. In this example, part of the surface of the model 7₁ of the first tool 7 corresponds to the radius of the apex of the tooth along the entire length of the second conical screw 12.

In other variant embodiments of the present invention, this part of the surface or the entire surface can correspond to other parameters of the shape of the target model.

The construction of the surface defining the shape of the model 7₁ of the first tool 7 on the basis of the geometric data produced with the aid of the processor in response to a user command is performed in order to control the deformation of the first truncated cone 13 (FIG. 7) in the second system of coordinates.

The movement, relative to one another, of the model 7₁ (FIG. 7) of the first tool 7 produced and the first truncated cone 13 is performed on the basis of a law for a cycloidal movement which imitates the movement during use of the first conical screw 11.

A deformed shape of the surface of the target model 8₁ of the first conical screw 11 is produced as the deformed shape of the surface of the target model 8 of the first solid 1, said deformed shape having the abovementioned several characteristics.

Geometric data for each point on the surface defining the deformed shape of the surface of the target model 8₁ of the first conical screw 11 are determined and stored as the geometric data for each point on the surface defining the deformed shape of the surface of the target model 8 of the first solid 1.

At least the height and diameter of each base of the second truncated cone 16 (FIG. 6) are introduced as the several characteristics defining the geometry of the shape of the surface of the model 16₁ (FIG. 6) of the semifinished product of the second conical screw 12. Furthermore, the characteristic of the surface roughness or any other characteristic can be introduced as the several characteristics defining the geometry of the shape of the surface of this model 16₁.

In other variant embodiments of the present invention for producing other mating geometric solids, several other characteristics specifically defining the geometry of the shape of the surface of these models can be introduced as the several characteristics defining the geometry of the shape of the surface of these models of the geometric solids.

The target model 8₁ (FIG. 4) of the first conical screw 11, which target model has the deformed shape of the surface, is used as the model 10₁ of the second tool 10.

The movement, relative to one another, of the target model 8₁ of the first conical screw 11 and the second truncated cone 16 is performed in accordance with a law for a cycloidal movement imitating the movement during use of the second conical screw 12, which mates with the first conical screw 11 as they move relative to one another.

The deformed shape of the surface of the target model 9₁ of the second conical screw 12 is produced as the deformed shape of the surface of the target model 9 of the second solid 2, said deformed shape having the abovementioned several characteristics.

Geometric data for each point on the surface defining the deformed shape of the surface of the target model 9₁ of the second conical screw 12 are determined and stored as the geometric data for each point on the surface defining the deformed shape of the surface of the target model 9 of the second geometric solid 2.

A flowchart for implementing the proposed method is illustrated in FIG. 8(*a, b, c, d, e, f, g*).

The use of the proposed method makes it possible to produce geometric data for each point on the surfaces defining the deformed shapes of the surfaces of the target models $8_1$, $9_1$ (FIG. 4 and FIG. 5) of the first and second conical screws 11, 12. The presence of these geometric data provides the possibility of producing conical screws having a complex shape of the mating surfaces with a surface roughness of up to 10 micrometers, that is surfaces which are processed with a precision which ensures snug mating of these screws without any gaps as they move relative to one another during use.

Moreover, the proposed method makes it possible to use the proposed invention for simplifying the production of conical screws of rotary screw compressors using standard equipment, for example a machine tool plant with program control which is already in existence at present in the industry.

The main advantage of the proposed method consists in that the deformation of the models $3_1$, $4_1$ of the semifinished products 3, 4 of the first and second geometric solids 1, 2 is performed with the aid of a model of the corresponding tool 7, 10.

A model $7_1$ of at least one first tool 7 is used as the model of the tool for producing the deformed shape of the surface of the target model 8 of the first geometric solid 1.

In order to construct the model $7_1$ of the first tool 7, geometric data for each point on the directrix 5 and geometric data for each point on the generatrix 6, which directrix and generatix form the surface defining the shape of the model $7_1$ of the first tool 7, are automatically calculated. This is performed with the aid of a processor in response to a user command using several mathematical laws, each of which comprises a polynomial in which at least one of the coefficients represents one of the several characteristics defining the geometry of the shape of the surface of the second geometric solid 2.

The deformation of the model $3_1$ of the semifinished product 3 of the first geometric solid 1 is performed with the aid of a processor in response to a user command by moving, relative to one another, a model $7_1$ of the at least one first tool 7 and the model $3_1$ of the semifinished product 3 of the first geometric solid 1 in accordance with a law for a movement imitating the movement during use of the first geometric solid 1, which mates with the second geometric solid 2 as they move relative to one another, by introducing the model $7_1$ of the at least one first tool 7 into the model $3_1$ of the semifinished product 3 of the first geometric solid 1, and by changing the shape of the surface of the model $3_1$ of the semifinished product 3 of the first geometric solid 1 with the aid of Boolean logic until the deformed shape of the surface of the target model 8 of the first geometric solid 1 is produced.

A target model 8 of the first geometric solid 1, said target model having a deformed surface shape, is used as the model $10_1$ of the second tool 10 for producing the deformed shape of the surface of the target model 9 of the second geometric solid 2.

The deformation of the model $4_1$ of the semifinished product of the second geometric solid 2 is performed with the aid of a processor in response to a user command by moving, relative to one another, the model $10_1$ of the second tool 10 and the model $4_1$ of the semifinished product 4 of the second geometric solid 2 in accordance with a law for a movement imitating the movement during use of the second geometric solid 2, which mates with the first geometric solid 1 as they move relative to one another, by introducing the model $10_1$ of the second tool 10 into the model $4_1$ of the semifinished product 4 of the second geometric solid 2, and by changing the shape of the surface of the model $4_1$ of the semifinished product 4 of the second geometric solid 2 with the aid of Boolean logic until the deformed shape of the surface of the target model 9 of the second geometric solid 2 is produced.

The determination and storage, with the aid of a processor, in response to a user command, of geometric data for each point on the surface defining the deformed shape of the surface of the target model 8 of the first geometric solid 1 and the deformed shape of the surface of the target model 9 of the second geometric solid, respectively, are performed.

The proposed method will be considered in more detail in the description relating to the operation of the proposed device.

PREFERRED USE OF THE INVENTION

The proposed method for using a computer graphics system for changing the shape of the surface of models of geometric solids with the aid of deformation can be implemented in the proposed device with the aid of any known computer graphics system suitable for implementing the abovementioned steps in this method.

In particular, the proposed device is intended for the automatic design of complex three-dimensional objects without using a file development framework and makes it possible for the user to produce deformed shapes of target models of various geometric solids.

The proposed device, which uses a computer graphics system for changing the shape of the surface of models of geometric solids with the aid of deformation, is intended for producing a deformed shape of surfaces of target models 8, 9 of at least a first and a second geometric solid 1, 2, which geometric solids mate with one another during use as they move relative to one another, for the subsequent production of said geometric solids.

Figure 9:
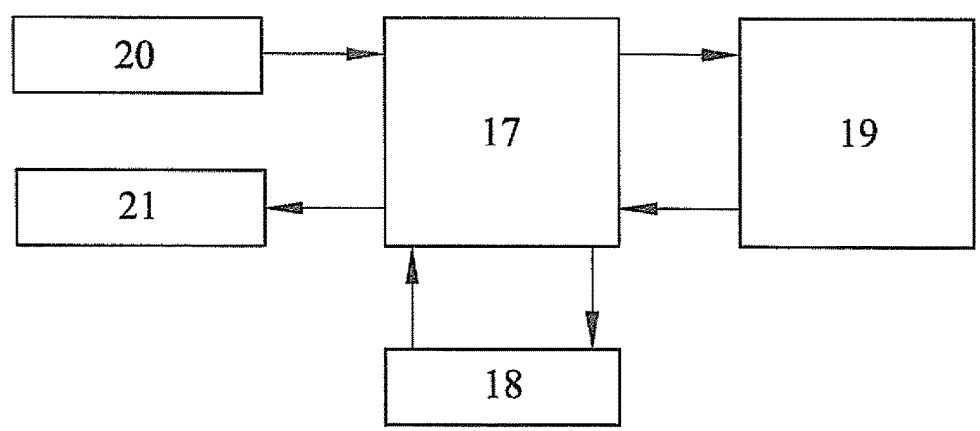
FIG. 9 shows a flowchart of the device for using a computer graphics system for changing the shape of the surfaces of models of geometric solids with the aid of deformation and producing a deformed shape of the surfaces of target models of at least a first and a second geometric solid, which geometric solids mate with one another during use as they move relative to one another, said device being designed in accordance with the invention.

The proposed device comprises a central processor 17 (FIG. 9), which has, connected to one another, an internal memory 18 and an external memory 19 and which is capable of receiving, processing and storing updated and long-term information. Moreover, the proposed device comprises an information input means 20, for example a keyboard (not shown in the drawing), and an information output means 21, with it being possible for any desired known means intended for similar purposes, for example, to be used as said information output means, said information input means and said information output means being connected to the central processor 17.

The external memory 19 of the central processor 17 comprises at least a program for storing input data, including:
  a programmed law for the movement of the first geometric solid 1, which mates, during use, with the second geometric solid 2 as they move relative to one another;
  a programmed law for the movement of the second geometric solid 2, which mates with the first geometric solid 1 as they move relative to one another during use;
  several programmed laws for the construction of the surfaces of models $3_1$, $4_1$ of semifinished products 3, 4 of the first and second solids 1, 2 in corresponding systems of coordinates on the basis of the several characteristics in response to a user command;
  several programmed laws for the automatic calculation of geometric data for each point on a directrix 5 and geometric data for each point on a generatrix 6, which directrix and generatrix form a surface defining the shape of a model $7_1$ of at least one first tool 7, wherein each of the laws is a polynomial in which at least one of the coefficients represents one of the several characteristics defining the geometry of the shape of the surface of the second geometric solid 2 in the second system of coordinates.

The internal memory 18 of the central processor 17 contains certain data and/or intermediate results which the processor 17 requires for its operation, and which include at least:

several characteristics defining the geometry of the shape of the surface of the first geometric solid 1 in a first system of coordinates with the start of the coordinates at point O;

several characteristics defining the geometry of the shape of the surface of the model $3_1$ of the semifinished product 3 of the first solid 1 in the first system of coordinates;

several characteristics defining the geometry of the shape of the surface of the second geometric solid 2 in a second system of coordinates with the start of the coordinates at point A;

several characteristics defining the geometry of the shape of the surface of the model $4_1$ of the semifinished product 4 of the second solid 2 in the second system of coordinates.

The central processor 17 is capable of performing the following steps:

automatically calculating, in response to a user command, geometric data for each point on the surface which defines the geometry of the shape of the surface of the model $3_1$ of the semifinished product 3 of the first solid 1 in the first system of coordinates;

automatically calculating, in response to a user command, geometric data for each point on the surface which defines the geometry of the shape of the surface of the model $4_1$ of the semifinished product 4 of the second solid 2 in the second system of coordinates;

automatically calculating, in response to a user command, geometric data for each point on the directrix 5 and geometric data for each point on the generatrix 6, which directrix and generatrix form the surface defining the shape of the model $7_1$ of the at least one first tool 7, which has at least part of the surface which imitates at least part of the surface of the second solid 2, which mates during use with the first solid 1 as they move relative to one another;

constructing the surfaces of the models $3_1$, $4_1$ of the semifinished products 3, 4 of the first and second solids 1, 2 in the corresponding systems of coordinates on the basis of the geometric data produced in response to a user command;

constructing the surface defining the shape of the model $7_1$ of the at least one first tool 7 for controlling the deformation of the model $3_1$ of the semifinished product 3 of the first solid 1 in the second system of coordinates on the basis of the geometric data produced in response to a user command;

applying a deformation to the model $3_1$ of the semifinished product 3 of the first geometric solid 1 with the aid of the processor 17 in response to a user command by moving, relative to one another, the model $7_1$ of the at least one first tool 7 and the model $3_1$ of the semifinished product 3 of the first geometric solid 1 in accordance with a law for a movement imitating the movement during use of the first geometric solid 1, which mates with the second geometric solid 2 as they move relative to one another, by introducing the model $7_1$ of the at least one first tool 7 into the model $3_1$ of the semifinished product 3 of the first geometric solid 1, and by changing the shape of the surface of the model $3_1$ of the semifinished product 3 of the first geometric solid 1 with the aid of Boolean logic until the deformed shape of the surface of the target model 8 of the first geometric solid 1 is produced, which deformed shape has the several characteristics defining the geometry of the shape of the surface of the first geometric solid 1;

determining and storing, with the aid of the processor 17, in response to a user command, geometric data for each point on the surface defining the deformed shape of the surface of the target model 8 of the first geometric solid 1 in the first system of coordinates;

constructing the surface of the model $4_1$ of the semifinished product 4 of the second geometric solid 2 in the second system of coordinates on the basis of the geometric data produced, with the aid of the processor 17, in response to a user command;

using the target model 8 of the first geometric solid 1 which has the deformed shape of the surface as the model $10_1$ of the second tool 10 for producing a deformed shape of the surface of the target model 9 of the second geometric solid 2;

applying a deformation to the model $4_1$ of the semifinished product 4 of the second geometric solid 2 with the aid of the processor 17 in response to a user command by moving, relative to one another, the model $10_1$ of the second tool 10 and the model $4_1$ of the semifinished product 4 of the second geometric solid 2 in accordance with a law for a movement imitating the movement, during use, of the second geometric solid 2, which mates with the first geometric solid 1 as they move relative to one another, by introducing the model $10_1$ of the second tool 10 into the model $4_1$ of the semifinished product 4 of the second geometric solid 2, and by changing the shape of the surface of the model $4_1$ of the semifinished product 4 of the second geometric solid 2 with the aid of Boolean logic until the deformed shape of the surface of the target model 9 of the second geometric solid 2 is produced, which target model has the several characteristics defining the geometry of the shape of the surface of the second geometric solid 2;

determining and storing, with the aid of the processor 17, in response to a user command, geometric data for each point on the surface defining the deformed shape of the surface of the target model 9 of the second geometric solid 2 in the second system of coordinates.

Moreover, the proposed device comprises a graphical monitor (not shown in the drawing), which is connected to the central processor 17 and is capable of visualizing the models of the geometric solids 1, 2 during the design process.

Furthermore, the information output means 21 is connected to the input of a numerical control means of a device for producing geometric solids (not shown in the drawing).

A machine tool with NC or a 3D printer or any other known device intended for similar purposes can be used as the device for producing geometric solids.

An initializer of a computer graphics system (not shown in the drawing) for automatically bringing said computer graphics system into action can be connected to the central processor 17.

The proposed device makes it possible to model geometric solids which mate with one another as they move relative to one another during use and which have, inter alia, a very complex shape of the mating surfaces, and then to manufacture each of these solids with a roughness of the mating surfaces of up to 10 micrometers.

This is explained in that, in the proposed device, the deformation is performed by moving the models in accordance with a law imitating the movement of the geometric solids, which mate with one another during use, as a result of which the possibility of producing precision of the surfaces of the first and second geometric solids and the possibility of said geometric solids mating with one another without any gaps as they move relative to one another during use are provided.

Moreover, the proposed device makes it possible to produce complete and accurate geometric data relating to each point on the surface of each mating geometric solid, which geometric data provide the possibility of manufacturing mating geometric solids having, inter alia, a very complex shape of the mating surfaces processed with a precision (with a surface roughness of up to 10 micrometers) which ensures snug mating of the geometric solids without any gaps as they move relative to one another during use. This is explained by the automatic calculation by means of the processor of all the geometric data.

This makes it possible to use the proposed invention, inter alia, for simplifying the production of conical screws of rotary screw compressors using standard equipment, for example a machine tool plant with program control already in existence in the industry at present.

The Proposed Device Operates in the Following Manner

Consideration will now be given to the operation of the proposed device using the example of the production of conical screws of a rotary screw compressor unit.

Prior to implementing the proposed method, the user selects a first conical screw 11 and a second conical screw 12, which has one tooth more than the first conical screw 11, as the first geometric solid 1 and the second geometric solid 2.

The first conical screw 11 and the second conical screw 12 represent set geometric solids which mate with one another during use as they move relative to one another and have set dimensions, set characteristics and a set precision for the roughness of the mating surfaces, that is geometric solids which are intended to be produced using the proposed invention.

The characteristics of the first conical screw 11 are dependent on the characteristics of the second conical screw 12, or vice versa, since these characteristics relate to two geometric solids which will mate with one another during use as they move relative to one another once they have been produced.

For efficient use of the proposed method, the models $13_1$, $16_1$ of the semifinished products 13, 16 of the first and second conical screws 11, 12 should at least remotely resemble the corresponding first and second conical screws 11, 12 (as illustrated in FIG. 1 and FIG. 2) and should have dimensions which make it possible to insert the target model $8_1$, $9_1$ of the corresponding conical screw 11, 12 into each corresponding model $13_1$, $16_1$ of the semifinished products 13, 16 of the first and second conical screws 11, 12. In this example, a first and a second truncated cone 13, 16 are used as the semifinished products 13, 16 of the first and second conical screws 11, 12, respectively.

Then, for example, the central processor 17 is brought into action with the aid of the initializer of the computer graphics system.

With the aid of the keyboard, the user inputs several characteristics defining the geometry of the shape of the surface of the first conical screw 11 into the processor 17.

As a rule, the number of teeth of the first conical screw 11, the length of this screw 11, the height of the teeth of this screw 11, the greatest and smallest diameter of the spiral toothed surface of the first truncated cone 13, which is used as the model $13_1$ of the semifinished product 13 of the first conical screw 11 and the number of turns of the spiral toothed surface along the length of the first truncated cone 13 are input as these characteristics.

The processor 17 stores the input characteristics of the first conical screw 11 in the internal memory 18 for subsequent use.

Then, with the aid of the keyboard, the user inputs several characteristics defining the geometry of the shape of the surface of the first truncated cone 13 into the processor.

The height of the first truncated cone 13 and the greatest and smallest diameter of the bases of the first truncated cone 13 are input as these characteristics.

The processor 20 stores the input characteristics of the first truncated cone 13 in the internal memory 18 for subsequent use.

Then, with the aid of the keyboard, the user inputs several characteristics defining the geometry of the shape of the surface of the second conical screw 12 into the processor 17.

The number of teeth of the second conical screw 12, the length of this screw 12, the height of the teeth of this screw 12, the greatest and smallest diameter of the spiral toothed surface of the second truncated cone 16, which is used as the model $16_1$ of the semifinished product 16 of the second conical screw 12, and the number of turns of the spiral toothed surface along the length of the second truncated cone 16 are input as these characteristics.

Reference will be made at this juncture to the fact that identical reference symbols 13 have been used in the description to denote the semifinished product of the first conical screw 11 and the first truncated cone since, in the drawings, these reference symbols denote one and the same element and also the same reference symbols 16 have been used to denote the semifinished product of the second conical screw 12 and the second truncated cone since, in the drawings, these reference symbols also denote one and the same element.

The processor 17 stores the input characteristics of the second conical screw 12 in the internal memory 18 for subsequent use.

Then, with the aid of the keyboard, the user inputs several characteristics defining the geometry of the shape of the surface of the model of the second truncated cone 16 into the processor 17.

The height of the second truncated cone 16 and the greatest and smallest diameter of the bases of the second truncated cone 16 are input as these characteristics.

The processor 17 stores the input characteristics of the second truncated cone in the internal memory 18 for subsequent use.

Then, with the aid of the keyboard, the user inputs the following mathematical laws into the processor 17 for automatically calculating, on the basis of the several characteristics input, the geometric data for each point on the surface of the first truncated cone 13 in a first system of coordinates with the start of the coordinates at point O and the geometric data for each point on the surface of the second truncated cone 16 in a second system of coordinates with the start of the coordinates at point A:

$$Z_3 = L_1 - \frac{(D_{1max} - D_{1min})\sqrt{X_3^2 - Y_3^2}}{2L_1}, \quad (3)$$

$$Z_4 = L_2 - \frac{(D_{2max} - D_{2min})\sqrt{X_4^2 - Y_4^2}}{2L_2}, \text{ where:} \quad (4)$$

$X_3$ and $X_4$ are the coordinates of each point on the surface of the first and second truncated cones 13, 16, respectively, along the axis X in the first and second systems of coordinates, respectively;

$Y_3$ and $Y_4$ are the coordinates of each point on the surface of the first and second truncated cones 13, 16, respectively, along the axis Y in the first and second systems of coordinates, respectively;

$Z_3$ and $Z_4$ are the coordinates of each point on the surface of the first and second truncated cones 13, 16, respectively, along the axis Z in the first and second systems of coordinates, respectively;

$L_1$ and $L_2$ are the lengths of the first and second truncated cones 13, 16, respectively (mm);

$D_{1max}$ and $D_{2max}$ are the maximum diameters of the first and second truncated cones 13, 16, respectively (mm);

$D_{1min}$ and $D_{2min}$ are the minimum diameters of the first and second truncated cones 13, 16, respectively (mm).

Once these mathematical laws have been input, the processor 17 stores them in the external memory 19 for subsequent use in the automatic calculation of the geometric data and construction of the semifinished products.

Then, with the aid of the keyboard, the user inputs several mathematical laws into the processor 17 which represent parametric expressions for the automatic calculation of the geometric data of each point on the directrix 5, which in this example comprises the conical spiral 14, and the geometric data of each point on the generatrix 6, which in this example comprises the circle 15.

The conical spiral 14 and the circle 15, which moves over the conical spiral 14, form the surface defining the shape of the model $7_1$ of the first tool 7. Furthermore, each of the mathematical laws represents a polynomial in which at least one of the coefficients represents one of the several characteristics defining the geometry of the shape of the surface of the second conical screw 12 in the second system of coordinates.

The parametric expression of the conical spiral 14 is as follows:

$$\begin{cases} X_1 = D_{3max} e^{-k\varphi} \cos\varphi \\ Y_1 = D_{3max} e^{-k\varphi} \sin\varphi, \text{ where:} \\ Z_1 = L_3(1 - e^{-k\varphi}) \end{cases} \quad (5)$$

$X_1$ is the coordinate of each point on the conical spiral 14 along the axis X in the second system of coordinates;

$Y_1$ is the coordinate of each point on the conical spiral 14 along the axis Y in the second system of coordinates;

$Z_1$ is the coordinate of each point on the conical spiral 14 along the axis Z in the second system of coordinates;

k is a coefficient which is dependent on the angle of inclination of the conical spiral 14 with respect to the axis M and which is equal to $$k = \frac{2L_3}{D_{3max} - D_{3min}}; \quad (6)$$

$L_3$ is the length of the spiral toothed surface of the second geometric solid 2 (mm);

$\varphi$ is the parameter of the parametric expression;

$D_{3max}$ is the maximum diameter of the spiral toothed surface of the second conical screw 12 in the second system of coordinates (mm);

$D_{3min}$ is the minimum diameter of the spiral toothed surface of the second conical screw 12 in the second system of coordinates (mm).

The parametric expression for the circle 15 is as follows:

$$X_3 + Y_3 = R \cdot e^{k\varphi} \quad (7), \text{ where:}$$

$X_3$ is the coordinate of each point on the circle 15 along the axis X in an auxiliary system of coordinates;

$Y_3$ is the coordinate of each point on the circle 15 along the axis Y in the auxiliary system of coordinates;

R is the radius of the circle 15 (mm).

The centres of a plurality of circle generatrices 15 lie on the conical spiral 14 in planes perpendicular to the spiral 14.

Furthermore, the radius R of the circle 15 is equal to the height of the corresponding tooth of the target model $9_1$ of the second conical screw 12, changes along the conical spiral 14 corresponding to the expression (7) and is dependent on the parameter $\varphi$ in the expression (7).

Once said mathematical laws have been input, the processor 17 stores these mathematical laws in the external memory 22 for subsequent use in the automatic calculation of the geometric data and the construction of the semifinished products.

Then, with the aid of the keyboard, the user gives the command to the processor 17 to construct a first rectangular system of coordinates for the vectors XO, YO, ZO with the start of the coordinates at point O, a second rectangular system of coordinates for the vectors XA, YA, ZA with the start of the coordinates at point A and auxiliary systems of coordinates for the vectors XF, YF, ZF with the start of the coordinates at each point on the conical spiral 14.

After said user command, the processor 17 randomly selects the point O which, in this example, lies on the axis N of the first truncated cone 13, the point A which, in this example, lies on the axis M of the second truncated cone 16 and points F which, in this example, correspond to each point on the conical spiral 14.

Then, the processor 17 constructs a first rectangular system of coordinates for the vectors XO, YO, ZO with the start of coordinates at point O, which rectangular system of coordinates is used by the processor 17 to construct the first truncated cone 13 and the target model $8_1$ of the first conical screw 11, a second rectangular system of coordinates for the vectors XA, YA, ZA with the start of coordinates at point A, which second rectangular system of coordinates is used by the processor 17 to construct the second truncated cone 16, the target model $9_1$ of the second conical screw 12 and the model $7_1$ of the first tool 7, and auxiliary rectangular systems of coordinates for the vectors XF, YF, ZF with the start of coordinates at each point on the conical spiral 14 of the model $7_1$ of the first tool 7, which auxiliary rectangular systems of coordinates are used by the processor 17 to construct the circle 15 of the model $7_1$ of the first tool 7.

Then, with the aid of the keyboard, the user gives the command to the processor 17 to implement the automatic calculation of the geometric data for each point on the surface of the first truncated cone 13 in the first system of coordinates and the geometric data for each point on the surface of the second truncated cone 16 in the second system of coordinates.

The processor 17 retrieves the above-described mathematical laws previously input by the user from the external memory 19 and calculates the geometric data for each point on the surface of the first truncated cone 13 in the first system of coordinates and the geometric data for each point on the surface of the second truncated cone 16 in the second system of coordinates.

After the automatic calculation of the geometric data, the processor 17 stores said geometric data in the internal memory 18 for subsequent use in the automatic calculation of the geometric data and the construction of the semifinished products.

Then, with the aid of the keyboard, the user gives the command to the processor 17 to implement the automatic construction of the first truncated cone 13 in the first system of coordinates on the basis of the geometric data produced.

On the basis of the user command, the processor 17 effects the automatic construction of the first truncated cone 13 in the first system of coordinates on the basis of the geometric data produced.

Then, with the aid of the keyboard, the user gives the command to the processor 17 to display the first truncated cone 13 on the monitor display using any desired known method suitable for similar purposes, for example B-Rep.

On the basis of the user command, the processor 17 displays the first truncated cone 1 on the monitor display.

Then, with the aid of the keyboard, the user gives the command to the processor 17 to produce, by automatic calculation, geometric data for each point on the surface defining the shape of the model $7_1$ of the first tool 7.

On the basis of the user command, the processor 17 retrieves the above-described mathematical laws previously input by the user from the external memory 19 and produces geometric data for each point of the conical spiral 14 in the second system of coordinates on the basis of the mathematical law (5) in which at least some of the coefficients represent characteristics of the second solid 2.

Then, the processor 17, on the basis of the geometric data produced, constructs a conical spiral 14 in the second system of coordinates.

Then, the processor 17 constructs auxiliary rectangular systems of coordinates at each point on the conical spiral 14 for constructing a corresponding circle 15 in the corresponding plane XFYF in such a way that the vector of the axis Z of each auxiliary system is directed tangentially to the conical spiral 14.

Then, the processor 17 produces the geometric data for each point of the circle 15 for each point on the conical spiral 14 on the basis of the mathematical law (6) in each plane XFYF.

Then, the processor 17 constructs a plurality of circles 15 whose radiuses change along the axis ZA in the second system of coordinates in accordance with the mathematical law (6) in each plane XFYF on the basis of the geometric data produced.

All of the plurality of circles 15 produced together form the model $7_1$ of the first tool 7, which represents a deformed truncated cone with an axis which represents a twisted conical spiral 14, while the generatrix 6 represents the circle 15.

After the automatic calculation of the geometric data, the processor 17 stores said geometric data in the internal memory 18 for subsequent use.

As a result of the above, the model $7_1$ produced of the first tool 7 represents part of the toothed surface of the second target solid 9 which corresponds to the apex of the tooth which, in perpendicular section to the helical toothed surface of the second conical screw 12, represents part of the circle 15 which has a radius equal to the radius of the model $7_1$ of the first tool 7.

Then, with the aid of the keyboard, the user gives the command to the processor 17 to implement the construction of the surface defining the shape of the model $7_1$ of the first tool 7 in the second system of coordinates for controlling the deformation of the first truncated cone 13, which deformation is arranged in the first system of coordinates, on the basis of the geometric data produced.

On the basis of the user command, the processor 17 implements the construction of the surface defining the shape of the model $7_1$ of the first tool 7 in the second system of coordinates on the basis of the geometric data produced.

Then, with the aid of the keyboard, the user gives the command to the processor 17 to display the surface of the model $7_1$ of the first tool 7 in the second system of coordinates on the monitor display.

On the basis of a user command, the processor 17 displays the surface of the model $7_1$ of the first tool 7 in the second system of coordinates on the monitor display.

Then, with the aid of the keyboard, the user gives the command to the processor 17 to apply a deformation to the first truncated cone 13 by moving the model $7_1$ of the first tool 7 relative to the first truncated cone 13 in accordance with a hypocycloidal law of movement which imitates the movement of the manufactured first conical screw 11, which mates with the manufactured second conical screw 12 during use as they move relative to one another. Furthermore, the processor 17 introduces the model $7_1$ of the first tool 7 into the first truncated cone 13 and changes the shape of the surface of the first truncated cone 13 with the aid of Boolean logic until a deformed target model $8_1$ of the first conical screw 11 is produced, said target model having the abovementioned several characteristics defining the geometry of the shape of the surface of the first conical screw 11.

During the process of the movement of the model $7_1$ of the first tool 7 relative to the first truncated cone 13, the first and second systems of coordinates imitate the movement of the first and second conical screws 11, 12, respectively. Since the model $3_1$ of the semifinished product 3 of the first solid 1 is constructed in the first system of coordinates and the model $7_1$ of the first tool 7 is constructed in the second system of coordinates, these models $3_1$, $7_1$ move together with their own systems of coordinates.

The axis N of the semifinished product $3_1$ of the first geometric solid 3 and the axis M of the model $7_1$ of the first tool 7 lie on axes ZO, ZA, respectively, of the first and second systems of coordinates and the movement of these axes N, M fully reproduces the movement of the axes ZO, ZA of the first and second systems of coordinates.

Furthermore, the first and second systems of coordinates effect a planetary movement relative to one another and a rotational movement around the corresponding axes ZO, ZA, and the models $3_1$, $7_1$ located in the corresponding systems of coordinates effect the same movements as are effected by the corresponding systems of coordinates.

The processor 17, on receiving a user command, applies the process of deformation to the first truncated cone 13. Furthermore, the processor 17 introduces the model $7_1$ of the first tool 7 into the first truncated cone 13 and changes the shape of the surface of the first truncated cone 13 with the aid of Boolean logic until a deformed target model $8_1$ of the first conical screw 11 is produced, said deformed model having the abovementioned several characteristics defining the geometry of the shape of the surface of the first conical screw 11.

The term "Boolean logic" is intended here to mean the removal of part of the first truncated cone 13 at the point of intersection (interference) between said first truncated cone and the model 7$_1$ of the first tool 7.

Furthermore, at each step in the movement of the model 7$_1$ of the tool 7 or the first truncated cone 13 as they intersect one another, the processor 17, with the aid of Boolean logic, removes part of the first truncated cone 13 which interferes with the model 7$_1$ of the first tool 7. Furthermore, the accuracy of the surface produced of the target model 8$_1$ of the first conical screw 11, and consequently also of the manufactured first conical screw 11, is dependent on the number of such steps.

In order to implement the abovementioned deformation, the model 7$_1$ of the tool 7 is set up in such a way that the position of the second solid 2 is imitated as it moves during use. That is to say that the model 7$_1$ of the first tool 7 replaces part of the complex surface of the second geometric solid 2 and moves around the model 3$_1$ of the semifinished product 3 of the first solid 1, or conversely, the model 3$_1$ of the semifinished product 3 moves relative to the model 7$_1$ of the first tool 7 in such a way that it completely imitates the process of movement during use of the manufactured geometric solids 1, 2.

Figure 7:
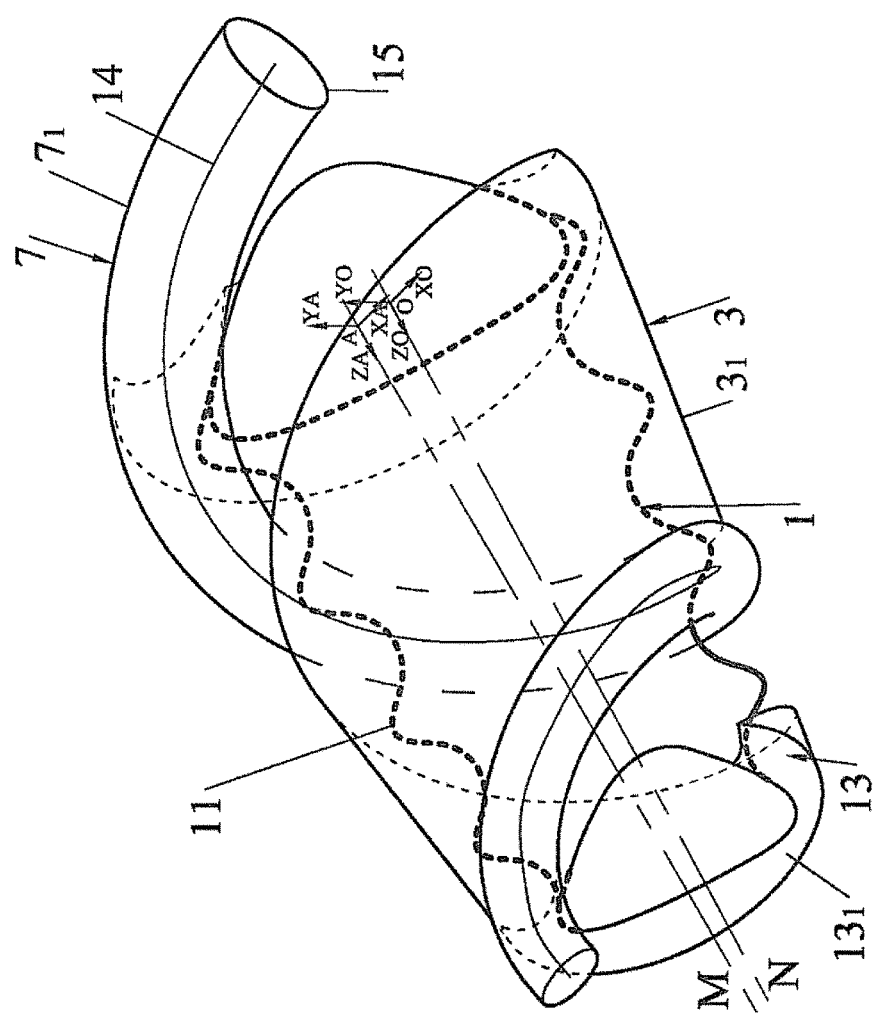
FIG. 7 shows a model of the first tool, which model is arranged outside the model of the semifinished product of the first geometric solid, and part of the target model of a first conical screw, in accordance with the invention, isometric.
Figure 8A:
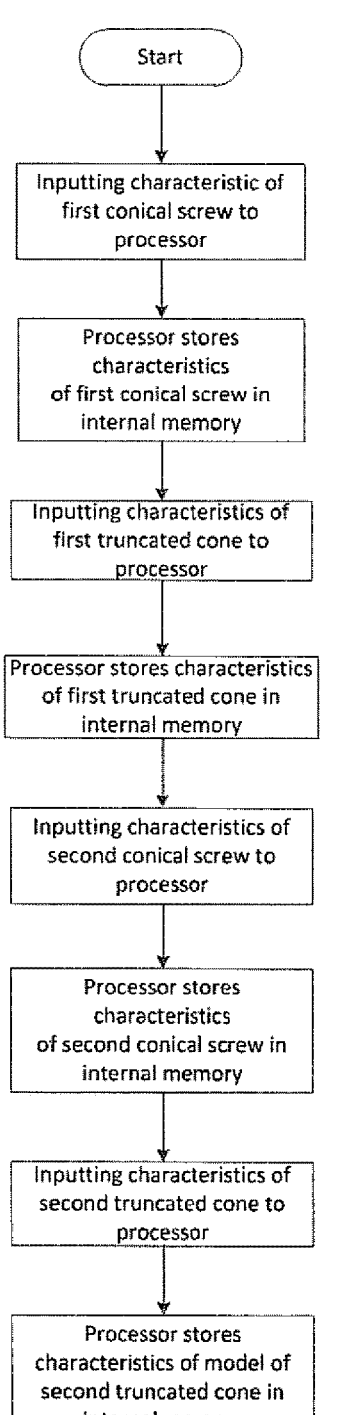
FIG. 8 shows a flowchart for the implementation of the proposed method.
Figure 8B:
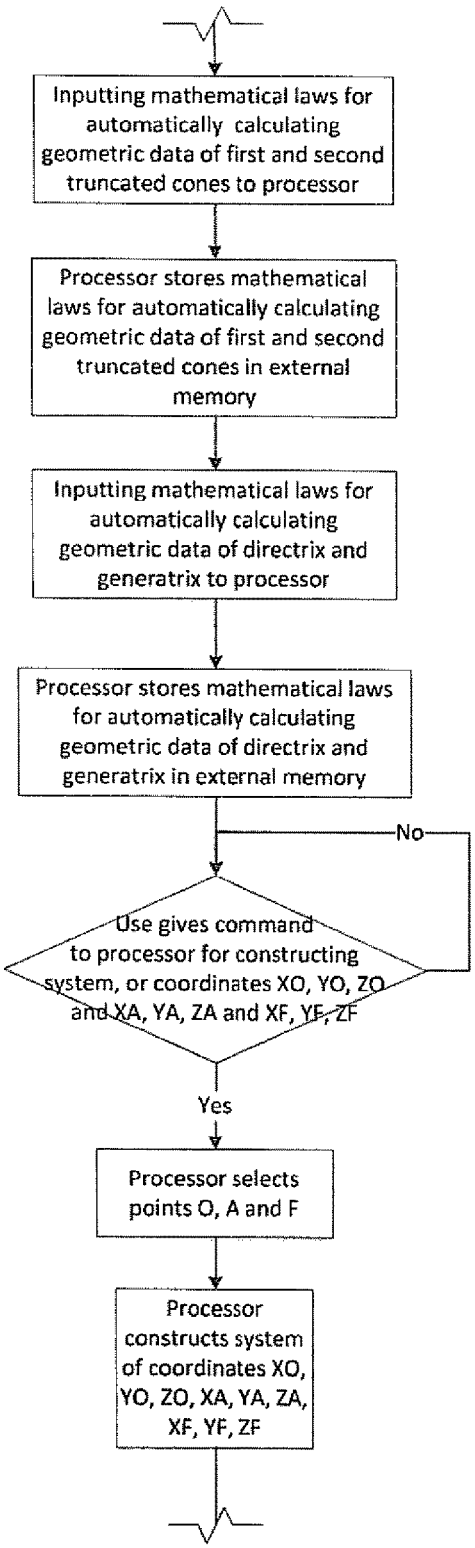
Figure 8C:
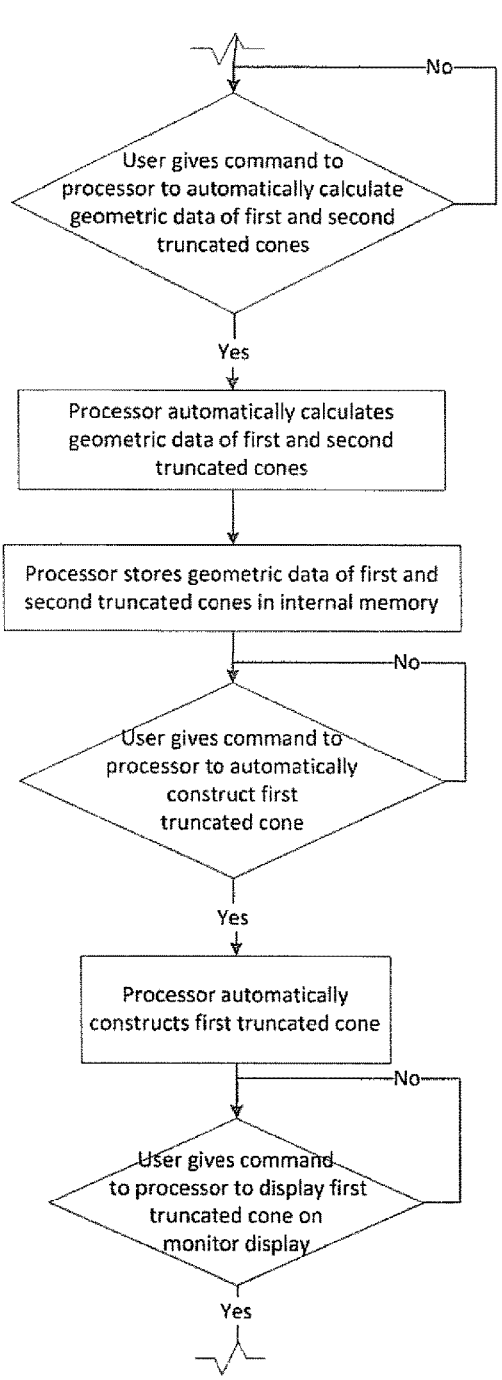
Figure 8D:
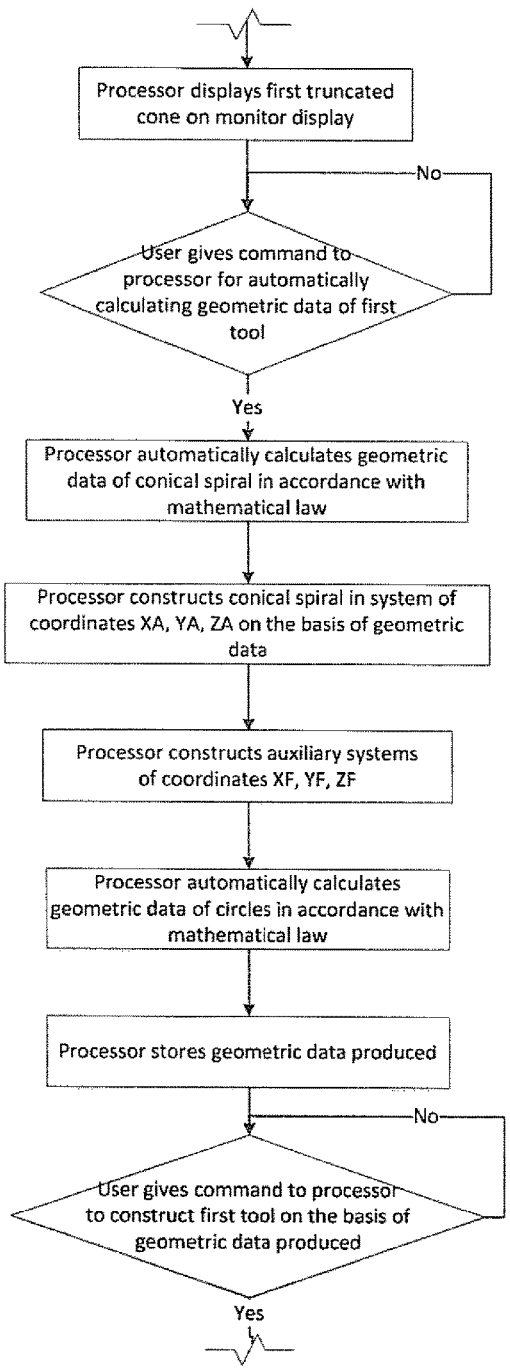
Figure 8G:
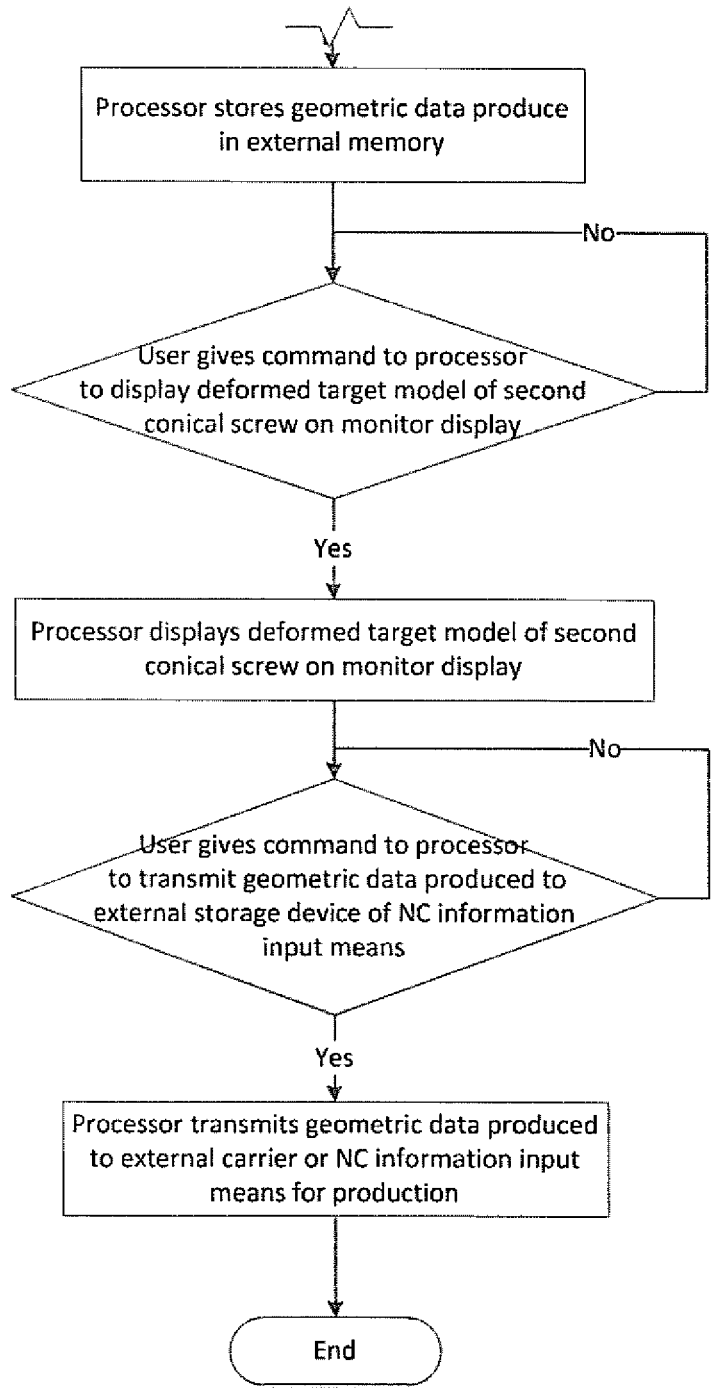

For example, as illustrated in FIG. 7, the model 7$_1$ of the first tool 7 moves around the first truncated cone 13 in accordance with the cycloidal law, that is to say that the model 7$_1$ of the first tool 7 rolls around the first truncated cone 13. Furthermore, at those points at which the model 7$_1$ of the first tool 7 interfered with the first truncated cone 13, the processor 17 removes part of the first truncated cone 13 by means of Boolean logic. Once the model 7$_1$ of the first tool 7 has removed all of the interfered parts of the first truncated cone 13, the deformed shape of the surface of the target model 8$_1$ of the first conical screw 11 will have been produced.

Then, with the aid of the keyboard, the user gives the command to the processor 17 to determine the geometric data for each point on the surface of the deformed target model 8$_1$ produced of the first conical screw 11.

After said user command, the processor 17 determines the geometric data for each point on the surface of the deformed target model 8$_1$ produced of the first conical screw 11 and stores said geometric data in the internal memory 18 and the external memory 19 for subsequent use.

If required, with the aid of the keyboard, the user gives the command to the processor 17 to display the surface of the deformed target model 8$_1$ of the first conical screw 11 in the first system of coordinates on the monitor display.

On the basis of a user command, the processor 17 displays the surface of the deformed target model 8$_1$ of the first conical screw 11 in the first system of coordinates on the monitor display.

Then, with the aid of the keyboard, the user gives the command to the processor 17 to implement automatic construction of the second truncated cone 16 in the second system of coordinates with the start of coordinates at point A on the basis of the geometric data produced.

In response to the user command, the processor 17 implements the construction of the second truncated cone 16 in the second system of coordinates on the basis of the previously produced geometric data.

Then, with the aid of the keyboard, the user gives the command to the processor 17 to apply a deformation to the second truncated cone 16 and to use the target model 8$_1$ of the first conical screw 11, which target model has the deformed shape of the surface, as the model 10$_1$ of the second tool 10 for controlling the deformation of the second truncated cone 16.

In response to the user command, the processor 17 applies a deformation to the second truncated cone 17 by moving, relative to one another, the model 10$_1$ of the second tool 10 and the second truncated cone 16 in accordance with a law for a movement imitating the movement of the second conical screw 12, which mates with the first conical screw 11 during use as they move relative to one another, by introducing the model 10$_1$ of the second tool 10 into the second truncated cone 16, and by changing the shape of the surface of the second truncated cone 16 with the aid of Boolean logic until the deformed shape of the surface of the target model 9$_1$ of the second conical screw 12 is produced, which target model has the abovementioned several characteristics defining the geometry of the shape of the surface of the second conical screw 12.

Figure 6:
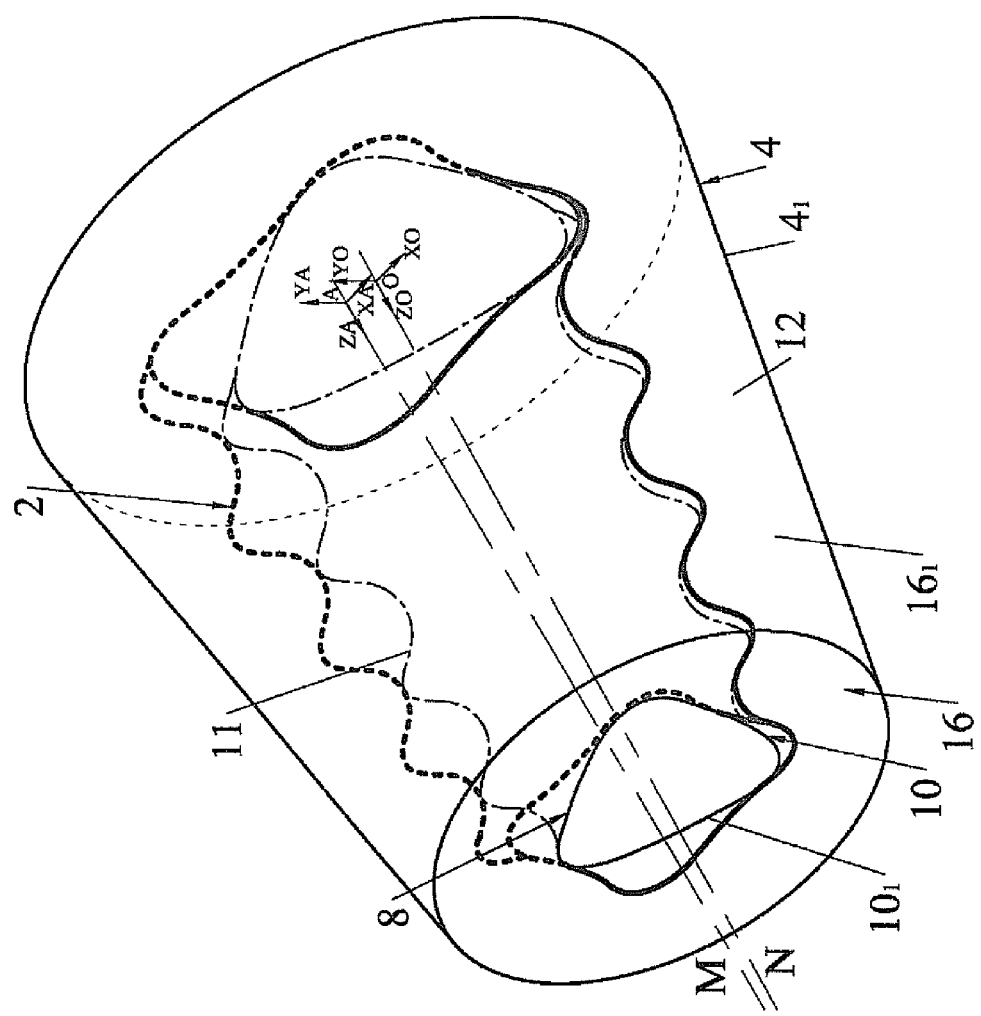
FIG. 6 shows a model of the second tool, which model is arranged inside a model of the semifinished product of the second geometric solid, and part of the target model of a second conical screw, in accordance with the invention, isometric.

The deformation of the second truncated cone 16 is performed in a similar manner to the deformation of the first truncated cone 13. However, as shown in FIG. 6, the model 10$_1$ of the second tool 10 is moved inside the second truncated cone 16 in accordance with a cycloidal law, that is the model 10$_1$ of the second tool 10 rolls inside the second truncated cone 16.

Then, with the aid of the keyboard, the user gives the command to the processor 17 to determine the geometric data for each point on the surface of the deformed target model 9$_1$ produced of the second conical screw 12.

After this user command, the processor 17 determines the geometric data for each point on the surface of the deformed target model 9$_1$ produced of the second conical screw 11 and stores said geometric data in the internal memory 18 and the external memory 19 for subsequent use.

If required, with the aid of the keyboard, the user gives the command to the processor 17 to display the surface of the deformed target model 9$_1$ of the second conical screw 11 in the second system of coordinates on the monitor display.

On the basis of the user command, the processor 17 displays the surface of the deformed target model 9$_1$ of the second conical screw 11 in the second system of coordinates on the monitor display.

Then, with the aid of the keyboard, the user gives the command to the processor 17 to transmit, via the information output means 21, the geometric data produced to the external storage device or directly to the information input means of the system of the machine tool with NC (not shown in the drawing). The system of the machine tool with NC stores, with the aid of its processor, the information received in its internal memory and/or, if required, on the external storage device. After this, on the basis of a command from the machine tool operator, the processor of the system of the machine tool with NC applies the geometric data received and, using any desired known technology, implements the production of the first and second conical screws 11, 12.

The conical screws produced have a complex shape of the mating surfaces processed with a precision (with a surface roughness of up to 10 micrometers) which ensures snug mating of these screws without any gaps as they move relative to one another during use.

The proposed invention simplifies the production of conical screws of rotary screw compressors using standard equipment, for example a machine tool plant with program control which is already in existence at present in the industry.

Any other desired mating geometric solids are produced with the aid of the proposed method in a similar manner to the above-described method for the first and second conical screws 11, 12.

Figure 10:
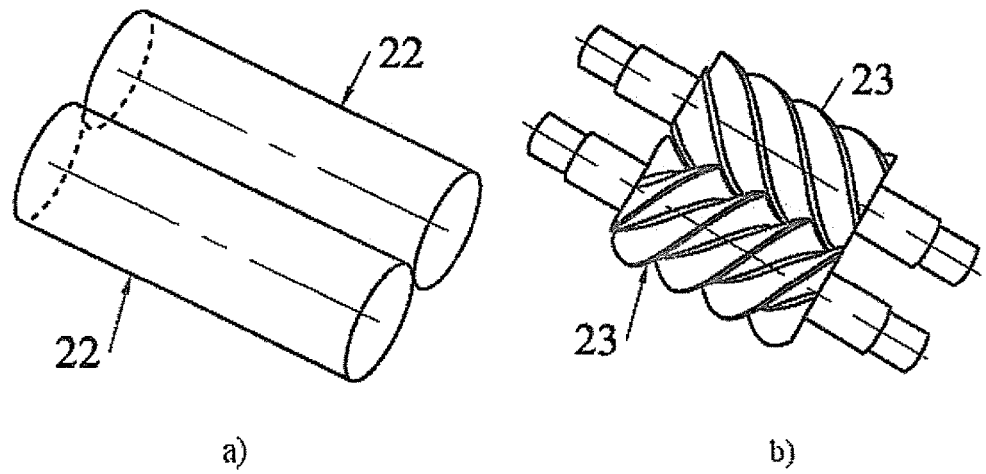
FIG. 10 shows an example of models of semifinished products and target models of a pair of cylindrical screws which can be produced using the proposed method, in accordance with the invention.

FIGS. 10(*a, b*), 11(*a, b*) and 12(*a, b*) illustrate examples of models produced with the aid of the proposed method.

FIG. 10(*a, b*) illustrates an example of models of semifinished products 22 of a pair of cylindrical screws and target models 23 of this pair of cylindrical screws which can be produced using the proposed method, in accordance with the invention.

Figure 11:
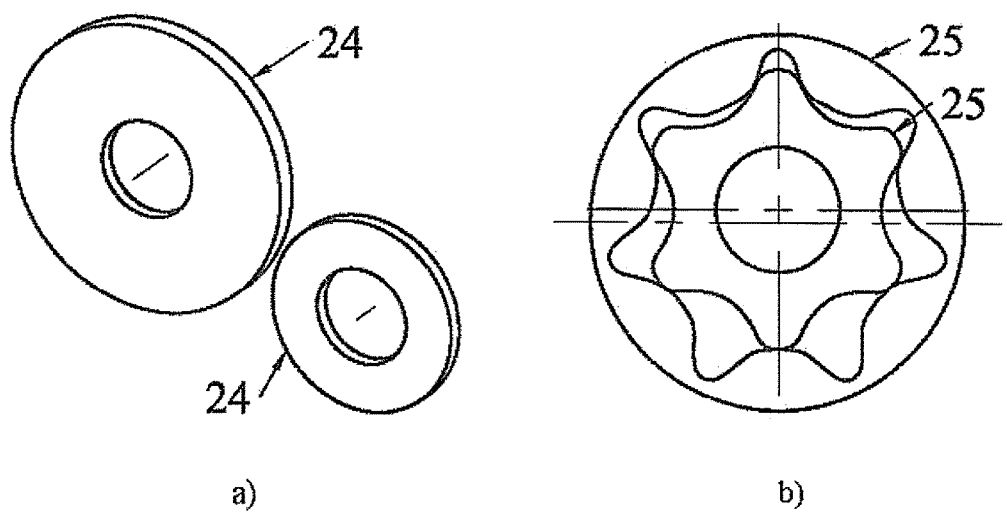
FIG. 11 shows an example of models of semifinished products and target models of a cycloidal wheel pair which can be produced using the proposed method, in accordance with the invention.

FIG. 11(*a, b*) illustrates an example of models 24 of semifinished products of a cycloidal wheel pair and target models 25 of this cycloidal wheel pair which can be produced using the proposed method, in accordance with the invention.

Figure 12:
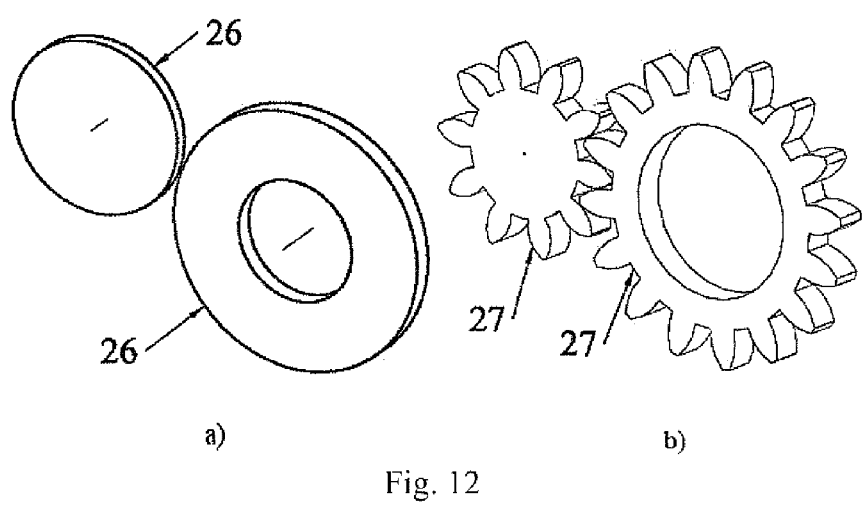
FIG. 12 shows an example of models of semifinished products and target models of a toothed wheel pair which can be produced using the proposed method, in accordance with the invention.

FIG. 12(*a, b*) illustrates an example of models 26 of semifinished products of a toothed wheel pair and target models 27 of this toothed wheel pair which can be produced using the proposed method, in accordance with the invention.

INDUSTRIAL APPLICABILITY

The present invention can be used in computer-aided design systems (CAD) for geometric solids having surfaces which mate with one another as these solids move relative to one another during use.

The present invention can be used most effectively for the production of at least two geometric solids comprising surfaces which mate with one another as they move relative to one another and which need to be manufactured with precision (up to 10 micrometers), for example toothed screws (cylindrical, conical) of a screw compressor unit, gears, gears of a gear pump and similar mating pairs of geometric solids.

The invention claimed is:

1. Method for changing the shape of the surfaces of models of geometric solids with the aid of deformation, during which process deformed shapes of the surfaces of target models of at least a first and a second geometric solid, which geometric solids mate with one another during use as they move relative to one another, are produced for subsequent production of said geometric solids, which method is characterized in that the deformation of models ($3_1$, $4_1$) of semifinished products (3, 4) of the at least first and second geometric solids (1, 2) is performed with the aid of a model ($7_1$, $10_1$) of a corresponding tool (7, 10);

the model ($7_1$) of the at least one first tool (7) is used as the model ($7_1$) of the tool (7) for producing the deformed shape of the surface of a target model (8) of the first geometric solid (1);

geometric data for each point on a directrix (5) and geometric data for each point on a generatrix (6), which directrix and generatrix form a surface defining the shape of the model ($7_1$) of the first tool (7), are automatically calculated with the aid of a processor (17) in response to a user command using at least one polynomial comprising at least one coefficient that represents one of several characteristics defining the geometry of the shape of the surface of the second geometric solid (2);

the deformation of the model ($3_1$) of the semifinished product (3) of the first geometric solid (1) is performed with the aid of the processor (17) in response to a user command by moving, relative to one another, the model ($7_1$) of the at least one first tool (7) and the model ($3_1$) of the semifinished product (3) of the first geometric solid (1) so as to imitate the movement during use of the first geometric solid (1), which mates with the second geometric solid (2) as they move relative to one another, by introducing the model ($7_1$) of the at least one first tool (7) into the model ($3_1$) of the semifinished product (3) of the first geometric solid (1), and by changing the shape of the surface of the model ($3_1$) of the semifinished product (3) of the first geometric solid (1) until a deformed shape of the surface of the target model (8) of the first geometric solid (1) is produced;

the target model (8) of the first geometric solid (1), said target model having the deformed shape of the surface, is used as the model ($10_1$) of the second tool (10) for producing a deformed shape of the surface of a target model (9) of the second geometric solid (2);

the deformation of the model ($4_1$) of the semifinished product of the second geometric solid (2) is performed with the aid of the processor (17) in response to a user command by moving, relative to one another, the model ($10_1$) of the second tool (10) and the model ($4_1$) of the semifinished product (4) of the second geometric solid (2) so as to imitate the movement during use of the second geometric solid (2), which mates with the first geometric solid (1) as they move relative to one another, by introducing the model ($10_1$) of the second tool (10) into the model ($4_1$) of the semifinished product (4) of the second geometric solid (2), and by changing the shape of the surface of the model ($4_1$) of the semifinished product (4) of the second geometric solid (2) until the deformed shape of the surface of the target model (9) of the second geometric solid (2) is produced;

the geometric data for each point on the surface defining the deformed shape of the surface of the target model (8) of the first geometric solid (1) and the deformed shape of the surface of the target model (9) of the second geometric solid (2), respectively, are determined and stored with the aid of the processor (17) in response to a user command; and in which the model ($3_1$, $4_1$) of each of the semifinished products (3, 4) has dimensions which make it possible to insert the corresponding target model (8, 9) of the corresponding geometric solid (1, 2) into each corresponding model ($3_1$, $4_1$) of the semifinished product (3, 4).

2. A method according to claim 1 wherein at least one of a), b) and c):— a) the method uses a computer graphics system to change the shape of the surfaces of the models of the geometric solids;

b) the at least one polynomial comprises several polynomials, each of which is a polynomial in which at least one of the coefficients represents said one of several characteristics defining the geometry of the shape of the surface of the second geometric solid (2);

c) changing the shape of the surface of the model ($3_1$) of the semifinished product (3) of the first geometric solid (1) and/or changing the shape of the surface of the model ($4_1$) of the semifinished product (4) of the second geometric solid (2) is performed with the aid of Boolean logic.

3. Method according to claim 1, which comprises the following steps:

inputting into the processor (17) and storing several characteristics defining the geometry of the shape of the surface of the first geometric solid (1) in a first system of coordinates with the start of the coordinates at point O;

inputting into the processor (17) and storing several characteristics defining the geometry of the shape of the surface of the model (3$_1$) of the semifinshed product (3) of the first geometric solid (1) in the first system of coordinates;

inputting into the processor (17) and storing several characteristics defining the geometry of the shape of the surface of the second geometric solid (2), which mates with the first geometric solid (1) during use as they move relative to one another, in a second system of coordinates with the start of the coordinates at point (A);

inputting into the processor (17) and storing several characteristics defining the geometry of the shape of the surface of the model (4$_1$) of the semifinshed product (4) of the second geometric solid (2) in the second system of coordinates;

inputting into the processor (17) and storing for the automatic calculation, on the basis of the several characteristics, of the geometric data for each point on the surface of the model (3$_1$) of the semifinished product (3) of the first geometric solid (1) in the first system of coordinates and the geometric data for each point on the surface of the model (4$_1$) of the semifinished product (4) of the second geometric solid (2) in the second system of coordinates;

inputting into the processor (17) and storing the at least one polynomial for the automatic calculation of the geometric data for each point on the directrix (5) and the geometric data for each point on the generatrix (6), which directrix and generatrix form the surface defining the shape of the model (7$_1$) of the at least one first tool (7), wherein in each polynomial at least one of the coefficients represents one of the several characteristics defining the geometry of the shape of the surface of the second geometric solid (2) in the second system of coordinates;

producing, by means of the automatic calculation, with the aid of the processor (17), in response to a user command, the geometric data for each point on the surface of the model (3$_1$) of the semifinished product (3) of the first geometric solid (1) in the first system of coordinates and the geometric data for each point on the surface of the model (4$_1$) of the semifinished product (4) of the second geometric solid (2) in the second system of coordinates;

constructing, on the basis of the geometric data produced, with the aid of the processor (17), in response to a user command, the surface of the model (3$_1$) of the semifinished product (3) of the first geometric solid (1) in the first system of coordinates;

producing, by means of the automatic calculation, with the aid of the processor (17), in response to a user command, the geometric data for each point on the directrix (5) and the geometric data for each point on the generatrix (6), which directrix and generatrix form the surface defining the shape of the model (7$_1$) of the at least one first tool (7), which has at least part of the surface imitating at least part of the surface of the second geometric solid (2);

constructing, on the basis of the geometric data produced, with the aid of the processor (17), in response to a user command, the surface defining the shape of the model (7$_1$) of the at least one first tool (7) for controlling the deformation of the model (3$_1$) of the semifinished product (3) of the first geometric solid (1) in the second system of coordinates;

applying a deformation to the model (3$_1$) of the semifinished product (3) of the first geometric solid (1) with the aid of the processor (17) in response to a user command by moving, relative to one another, the model (7$_1$) of the at least one first tool (7) and the model (3$_1$) of the semifinished product (3) of the first geometric solid (1) so as to imitate the movement during use of the first geometric solid (1), which mates with the second geometric solid (2) as they move relative to one another, by introducing the model (7$_1$) of the at least one first tool (7) into the model (3$_1$) of the semifinished product (3) of the first geometric solid (1), and by changing the shape of the surface of the model (3$_1$) of the semifinished product (3) of the first geometric solid (1) with the aid of Boolean logic until the deformed shape of the surface of the target model (8) of the first geometric solid (1), is produced, which deformed shape has the several characteristics defining the geometry of the shape of the surface of the first geometric solid (1);

determining and storing, with the aid of the processor (17), in response to a user command, the geometric data for each point on the surface defining the deformed shape of the surface of the target model (8) of the first geometric solid (1) in the first system of coordinates;

constructing, on the basis of the geometric data produced, with the aid of the processor (17), in response to a user command, the surface of the model (4$_1$) of the semifinished product (4) of the second geometric solid (2) in the second system of coordinates;

using the target model (8) of the first geometric solid (1) having the deformed shape of the surface as the second tool (10) for producing the deformed shape of the surface of the target model (9) of the second geometric solid (2);

applying a deformation to the model (4$_1$) of the semifinished product (4) of the second geometric solid (2) with the aid of the processor (17), in response to a user command, by moving, relative to one another, the model (10$_1$) of the second tool (10) and the model (4$_1$) of the semifinished product (4) of the second geometric solid (2) so as to imitate the movement during use of the second geometric solid (2), which mates with the first geometric solid (1) as they move relative to one another, by introducing the model (10$_1$) of the second tool (10) into the model (4$_1$) of the semifinished product (4) of the second geometric solid (2), and by changing the shape of the surface of the model (4$_1$) of the semifinished product (4) of the second geometric solid (2) with the aid of Boolean logic until the deformed shape of the surface of the target model (9) of the second geometric solid (2) is produced, which deformed shape has the several characteristics defining the geometry of the shape of the surface of the second geometric solid (2);

determining and storing, as mentioned, with the aid of the processor (17), in response to a user command, the geometric data for each point on the surface defining the deformed shape of the surface of the target model (9) of the second geometric solid (2) in the second system of coordinates.

4. Method according to claim 3, in which the geometric data for each point on the surface defining the deformed shape of the surface of the target model (8) of the first geometric solid (1) in the first system of coordinates and the geometric data for each point on the surface defining the deformed shape of the surface of the target model (9) of the second geometric solid (2) in the second system of coordinates are output to the input of a numerical control means of a device for producing geometric solids.

5. Method according to claim 1, in which, in addition, the following steps are implemented:
using the processor (17) to display, in response to a user command, the surface of the model (3₁) of the semifinished product (3) of the first geometric solid (1) in the first system of coordinates;
using the processor (17) to display, in response to a user command, the model (7₁) of the at least one first tool (7) in the second system of coordinates;
using the processor (17) to display, in response to a user command, the deformed shape of the surface of the target model (8) of the first geometric solid (1) in the first system of coordinates;
using the processor (17) to display, in response to a user command, the surface of the model (4₁) of the semifinished product (4) of the second geometric solid (2) in the second system of coordinates;
using the processor (17) to display, in response to a user command, the deformed shape of the surface of the target model (9) of the second geometric solid (2) in the second system of coordinates.

6. Method according to claim 1, in which a model of a geometric solid having a simple surface shape is selected as each model (3₁) of the semifinished product (3) of the first geometric solid (1) and each model (4₁) of the semifinished product (4) of the second geometric solid (2).

7. Method according to claim 1, in which a geometric solid having a complex surface shape is selected as each geometric solid (1, 2).

8. Method according to claim 3, in which
a first conical screw (11) is selected as the first geometric solid (1);
a second conical screw (12) which has one tooth more than the first conical screw (11) is selected as the second geometric solid (2), which mates with the first geometric solid (1) as they move relative to one another during use;
at least the length, the maximum diameter, the minimum diameter, the number of turns of the spiral toothed surface, the number of teeth, and the height of each tooth of the first conical screw (11) are introduced as the several characteristics defining the geometry of the shape of the surface of the first conical screw (11);
at least the height and diameter of each base of a first truncated cone (13) are introduced as the several characteristics defining the geometry of the shape of the surface of the model (13₁) of the semifinished product of the first conical screw (11);
the length, the maximum diameter, the minimum diameter, the number of turns, the number of teeth and the height of each tooth of the second conical screw (12) are introduced as the several characteristics defining the geometry of the second conical screw (12);
a conical spiral (14) is used as the directrix (5), which forms the surface defining the shape of the model (7₁) of the at least one first tool (7);
a circle (15) which comprises a closed planar simple curve is used as the generatrix (6), which forms the surface defining the shape of the model (7₁) of the at least one first tool (7);
a first polynomial:

$$\begin{cases} X_1 = F_1(t) \\ Y_1 = F_2(t) \\ Z_1 = F_3(t) \end{cases},$$

where:
$X_1$ is the coordinate of each point on the conical spiral (14) along the axis X in the second system of coordinates;
Y1 is the coordinate of each point on the conical spiral (14) along the axis Y in the second system of coordinates;
Z1 is the coordinate of each point on the conical spiral (14) along the axis Z in the second system of coordinates;
F1 is the function of the coordinate along the axis X in dependence on the parameter of the polynomial comprising the coefficient which represents one of the several characteristics defining the geometry of the shape of the surface of the second conical screw (12) in the second system of coordinates;
F2 is the function of the coordinate along the axis Y in dependence on the parameter of the polynomial comprising the coefficient which represents one of the several characteristics defining the geometry of the shape of the surface of the second conical screw (12) in the second system of coordinates;
F3 is the function of the coordinate along the axis Z in dependence on the parameter of the polynomial comprising the coefficient which represents one of the several characteristics defining the geometry of the shape of the surface of the second conical screw (12) in the second system of coordinates;
T is the parameter of the functions F1, F2, F3;
is used as the corresponding polynomial which in the automatic calculation of the geometric data for each point on the conical spiral (14);
a second polynomial:

$$Y_2 = G(X_2), \qquad \text{where:}$$

X2 is the coordinate of each point on the circle (15) along the axis X in the second system of coordinates;
Y2 is the coordinate of each point on the circle (15) along the axis Y in the second system of coordinates;
G is the function of the coordinate Y2 along the axis Y in dependence on the coordinate X2 along the axis X, which function comprises the coefficient representing one of the several characteristics defining the geometry of the shape of the surface of the second conical screw (12) in the second system of coordinates;
is used as the corresponding polynomial which in the automatic calculation of the geometric data for each point on the circle (15);
the geometric data for each point on the conical spiral (14) and the geometric data for each point on the circle (15), which conical spiral and circle form the surface defining the shape of the model (7₁) of the at least one first tool (7) which has at least part of the surface which imitates at least part of the surface of the second conical screw (12), are produced as the geometric data for each point on the surface defining the shape of the model (7₁) of the at least one first tool (7);
the construction of the surface defining the shape of the model (7₁) of the at least one first tool (7) on the basis of the geometric data produced with the aid of the processor (17) in response to a user command is performed in order to control the deformation of the first truncated cone (13) in the second system of coordinates;

the movement, relative to one another, of the model ($7_1$) of the at least one first tool (7) produced and the first truncated cone (13) imitates the movement during use of the first conical screw (11), which mates with the second conical screw (12) as they move relative to one another;

a deformed shape of the surface of the target model ($8_1$) of the first conical screw (11) is produced as the deformed shape of the surface of the target model (8) of the first solid (1), said deformed shape having the several characteristics;

geometric data for each point on the surface defining the deformed shape of the surface of the target model ($8_1$) of the first conical screw (11) are determined and stored as the geometric data for each point on the surface defining the deformed shape of the surface of the target model ($8_1$) of the first geometric solid (1);

at least the height and diameter of each base of the second truncated cone (16) are introduced as the several characteristics defining the geometry of the shape of the surface of the model ($16_1$) of the semifinished product of the second conical screw (12);

the target model ($8_1$) of the first conical screw (11), which target model has the deformed shape of the surface, is used as the model ($10_1$) of the second tool (10);

the movement, relative to one another, of the model ($10_1$) of the second tool (10) and the second truncated cone (16) imitates the movement during use of the second conical screw (12), which mates with the first conical screw (11) as they move relative to one another;

the deformed shape of the surface of the target model ($9_1$) of the second conical screw (12) is produced as the deformed shape of the surface of the target model (9) of the second solid (2), said deformed shape having the several characteristics;

geometric data for each point on the surface defining the deformed shape of the surface of the target model ($9_1$) of the second conical screw (12) are determined and stored as the geometric data for each point on the surface defining the deformed shape of the surface of the target model (9) of the second geometric solid (2).

9. A method in accordance with claim 1, wherein each of the first geometric solid (1) and the second geometric solid (2) comprises a conical screw, a conical screw of a rotary screw compressor unit, a gear element, or a gear of a gear pump.

10. Method according to claim 1, the method further comprising:

outputting to the input of a numerical control means of a device for producing geometric solids the geometric data for points on the surface defining the deformed shape of the surface of the target model (8) of the first geometric solid (1) and the deformed shape of the surface of the target model (9) of the second geometric solid; and producing the first and second geometric solids (1, 2) using the device for producing geometric solids.

11. Method of producing first and second geometric solids comprising:

receiving at an input of a numerical control means of a device for producing geometric solids geometric data obtained by performing the method of claim 1, the geometric data being for points on a surface defining the deformed shape of the surface of a target model (8) of the first geometric solid (1) and the deformed shape of the surface of the target model (9) of the second geometric solid; and producing the first and second geometric solids (1, 2) using the device for producing geometric solids.

12. Device for using a computer graphics system for changing the shape of the surfaces of models of geometric solids with the aid of deformation and producing a deformed shape of the surfaces of target models of at least a first and a second geometric solid, which geometric solids mate with one another during use as they move relative to one another, for subsequent production of said geometric solids, said device comprising:

a central processor (17), which has, connected to one another, an internal memory (18) and an external memory (19) and which is capable of receiving, processing and storing updated and long-term information;

an information input means (20), which is connected to the central processor;

an information output means (21), which is connected to the central processor;

the external memory (19) of the central processor (17), which external memory comprises at least a program for storing input data, including:

a first set of coordinates imitating the movement of the first geometric solid (1), which mates, during use, with the second geometric solid (2) as they move relative to one another;

a second set of coordinates imitating the movement of the second geometric solid (2), which mates with the first geometric solid (1) as they move relative to one another during use;

several polynomials for use in the construction of the surfaces of models ($3_1$, $4_1$) of semifinished products (3, 4) of the first and second geometric solids (1, 2) in the corresponding systems of coordinates on the basis of the characteristics in response to a user command;

several polynomials for use in the automatic calculation of geometric data for each point on a directrix (5) and geometric data for each point on a generatrix (6), which directrix and generatrix form a surface defining the shape of a model ($7_1$) of at least one first tool (7), wherein in each polynomial at least one of the coefficients represents one of the several characteristics defining the geometry of the shape of the surface of the second geometric solid (2) in the second system of coordinates;

the internal memory (18) of the central processor (17), which internal memory contains certain data and/or intermediate results which the processor (17) requires for its operation, including:

several characteristics defining the geometry of the shape of the surface of the first geometric solid (1) in a first system of coordinates with the start of the coordinates at point O;

several characteristics defining the geometry of the shape of the surface of the model ($3_1$) of the semifinished product (3) of the first geometric solid (1) in the first system of coordinates;

several characteristics defining the geometry of the shape of the surface of the second geometric solid (2) in a second system of coordinates with the start of the coordinates at point A;

several characteristics defining the geometry of the shape of the surface of the model ($4_1$) of the semifinished product (4) of the second geometric solid (2) in the second system of coordinates;

the central processor (17), which is capable of performing the following steps:

automatically calculating, in response to a user command, geometric data for each point on the surface which defines the geometry of the shape of the surface of the model (3₁) of the semifinished product (3) of the first geometric solid (1) in the first system of coordinates;

automatically calculating, in response to a user command, geometric data for each point on the surface which defines the geometry of the shape of the surface of the model (4₁) of the semifinished product (4) of the second geometric solid (2) in the second system of coordinates;

automatically calculating, in response to a user command, the geometric data for each point on the directrix (5) and the geometric data for each point on the generatrix (6), which directrix and generatrix form the surface defining the shape of the model (7₁) of the at least one first tool (7), which has at least part of the surface which imitates at least part of the surface of the second geometric solid (2);

constructing the surfaces of the models (3₁, 4₁) of the semifinished products (3, 4) of the first and second geometric solids (1, 2) in the corresponding systems of coordinates on the basis of the geometric data produced in response to a user command;

constructing the surface defining the shape of the model (7₁) of the at least one first tool (7) for controlling the deformation of the model (3₁) of the semifinished product (3) of the first geometric solid (1) in the second system of coordinates on the basis of the geometric data produced in response to a user command;

applying a deformation to the model (3₁) of the semifinished product (3) of the first geometric solid (1) in response to a user command by moving, relative to one another, the model (7₁) of the at least one first tool (7) and the model (3₁) of the semifinished product (3) of the first geometric solid (1) so as to imitate the movement during use of the first geometric solid (1), which mates with the second geometric solid (2) as they move relative to one another, by introducing the model (7₁) of the at least one first tool (7) into the model (3₁) of the semifinished product (3) of the first geometric solid (1), and by changing the shape of the surface of the model (3₁) of the semifinished product (3) of the first geometric solid (1) with the aid of Boolean logic until the deformed shape of the surface of the target model (8) of the first geometric solid (1) is produced, which deformed shape has the several characteristics defining the geometry of the shape of the surface of the first geometric solid (1);

determining and storing, in response to a user command, geometric data for each point on the surface defining the deformed shape of the surface of the target model (8) of the first solid (1) in the first system of coordinates;

constructing the surface of the model (4₁) of the semifinished product (4) of the second geometric solid (2) in the second system of coordinates on the basis of the characteristics in response to a user command;

using the target model (8) of the first geometric solid (1) which has the deformed shape of the surface as the model (10₁) of the at least one second tool (10) for controlling the deformation of the model (4₁) of the semifinshed product (4) of the second geometric solid (2);

applying a deformation to the model (4₁) of the semifinished product (4) of the second geometric solid (2) in response to a user command by moving, relative to one another, the model (10₁) of the second tool (10) and the model (4₁) of the semifinished product (4) of the second geometric solid (2) so as to imitate the movement of the second geometric solid, which mates with the first geometric solid (1) as they move relative to one another during use, by introducing the model (10₁) of the second tool (10) into the model (4₁) of the semifinished product (4) of the second geometric solid (2), and by changing the shape of the surface of the model (4₁) of the semifinished product (4) of the second geometric solid (2) with the aid of Boolean logic until the deformed shape of the surface of the target model (9) of the second geometric solid (2) is produced, which target model has the several characteristics defining the geometry of the shape of the surface of the hypothetical first geometric solid (1);

determining and storing, in response to a user command, geometric data for each point on the surface defining the deformed shape of the surface of the target model (9) of the second geometric solid (2) in the second system of coordinates.

13. Device according to claim 12, comprising a graphical monitor, which is connected to the central processor (17) and is capable of visualizing the models of the geometric solids (1, 2) during the design process.

14. Device according to claim 12, in which the information output means (21) is connected to the input of a numerical control means of a device for producing the geometric solids (1, 2).

* * * * *